United States Patent
Hill

(10) Patent No.: US 6,906,711 B2
(45) Date of Patent: Jun. 14, 2005

(54) GRAPH-BASED METHOD FOR MULTI-BODIED SWEEP TERMINATIONS

(75) Inventor: Kenneth J. Hill, South Lyon, MI (US)

(73) Assignee: Autodesk, Inc., San Rafael, CA (US)

(*) Notice: Subject to any disclaimer, the term of this patent is extended or adjusted under 35 U.S.C. 154(b) by 316 days.

(21) Appl. No.: 09/887,651

(22) Filed: Jun. 21, 2001

(65) Prior Publication Data

US 2002/0113785 A1 Aug. 22, 2002

Related U.S. Application Data

(60) Provisional application No. 60/269,831, filed on Feb. 20, 2001.

(51) Int. Cl.⁷ .............................................. G06T 17/00
(52) U.S. Cl. ...................... 345/420; 345/419; 345/441; 700/182
(58) Field of Search ................................ 345/420, 441, 345/419; 700/182

(56) References Cited

U.S. PATENT DOCUMENTS 5,351,196 A * 9/1994 Sowar et al. ................ 700/182

OTHER PUBLICATIONS

Ji et al. "Machine Interpretation of CAD Data for Manufacturing Applications", ACM, published Sep. 1997, pp. 263–311.*

* cited by examiner

*Primary Examiner*—Kimbinh T. Nguyen
(74) *Attorney, Agent, or Firm*—Gates & Cooper LLP

(57) ABSTRACT

A computer-implemented solid modeling system provides a graph-based method for multi-bodied sweep terminations in a computer-implemented solid modeling system. A planar profile of one or more curves is generated, and the profile swept along a specified path to generate a tool body. The swept profile is terminated after the tool body interacts with a plurality of blank bodies to a predefined extent. The termination is comprised of three phases: (1) a pre-processing phase is performed to label faces and edges of the tool and blank bodies; (2) an analysis phase is performed to extract tool and blank graphs for the labeled faces and edges; and (3) a post-processing phase is performed to integrate results from the extracted tool and blank graphs.

57 Claims, 22 Drawing Sheets

GRAPH-BASED METHOD FOR MULTI-BODIED SWEEP TERMINATIONS

CROSS-REFERENCE TO RELATED APPLICATIONS

This application claims the benefit under 35 U.S.C. §119 (e) of co-pending and commonly assigned U.S. Provisional Patent Application Ser. No. 60/269,831, filed on Feb. 20, 2001, by Kenneth J. Hill, entitled "GRAPH-BASED METHOD FOR MULTI-BODIED SWEEP TERMINATIONS," which application is incorporated by reference herein.

BACKGROUND OF THE INVENTION

1. Field of the Invention

The present invention relates generally to computer-assisted design (CAD) systems, and in particular, to a graph-based method for multi-bodied sweep terminations in a computer-implemented solid modeling system.

2. Description of the Related Art

Over the last decade, designers have changed their fundamental approach to graphics design, moving from two-dimensional (2D) drawing systems to three-dimensional (3D) solid modeling systems. New software makes solid modeling technology available and affordable to virtually anyone.

Solid modeling is a technique that allows designers to create dimensionally accurate 3D solid models in a 3D space represented within a computer, rather than traditional 2D drawings. 3D solid models include significantly more engineering data than 2D drawings, including the volume, bounding surfaces, and edges of a design.

With the graphics capabilities of today's computers, these 3D solid models may be viewed and manipulated on a monitor. In addition to providing better visualization, 3D solid models may be used to automatically produce 2D drawing views, and can be shared with manufacturing applications and the like.

Some 3D solid modeling systems generate parametric feature-based models. A parametric feature-based model is comprised of intelligent features, such as holes, fillets, chamfers, etc. The geometry of the parametric feature-based model is defined by underlying mathematical relationships (i.e., parameters) rather than by simple unrelated dimensions, which makes them easier to modify. These systems preserve design intent and manage it after every change to the model.

An operation often performed by solid modeling systems to create parametric feature-based models is a profile sweep. A user typically draws a planar, simple (not self-intersecting) profile of curves and then instructs the solid modeling system to sweep the profile along a specified path (e.g., linearly for extrusions and circularly for revolutions). The result of the profile sweep is a shaped solid body or part.

However, the termination of profile sweeps (including extrusions and revolutions as special cases) is a non-trivial operation. This is especially true when multiple bodies are involved in the termination. Consequently, there is a need in the art for new methods of handling the termination of profile sweeps for multiple bodies in a solid modeling system.

SUMMARY OF THE INVENTION

To address the requirements described above, the present invention discloses a computer-implemented solid modeling system that provides a graph-based method for multi-bodied sweep terminations in a computer-implemented solid modeling system. Specifically, the present invention comprises a method, apparatus, and article of manufacture for terminating profile sweeps for multiple bodies in a computer-implemented solid modeling system. A planar profile of one or more curves is generated, and the profile is swept along a specified path to generate a tool body. The swept profile is terminated after the tool body interacts with a plurality of blank bodies to a predefined extent. The termination is comprised of three phases: (1) a pre-processing phase is performed to label faces and edges of the tool and blank bodies; (2) an analysis phase is performed to extract tool and blank graphs for the labeled faces and edges; and (3) a post-processing phase is performed to integrate results from the extracted tool and blank graphs.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a parametric, feature-based solid modeling system that provides a graph-based method for multi-bodied sweep terminations. Terminating profile sweeps is a fundamental operation in solid-modeling systems. The present invention describes a new technique for handling the termination of a profile sweep when multiple bodies are involved.

Hardware and Software Environment

Figure 1:
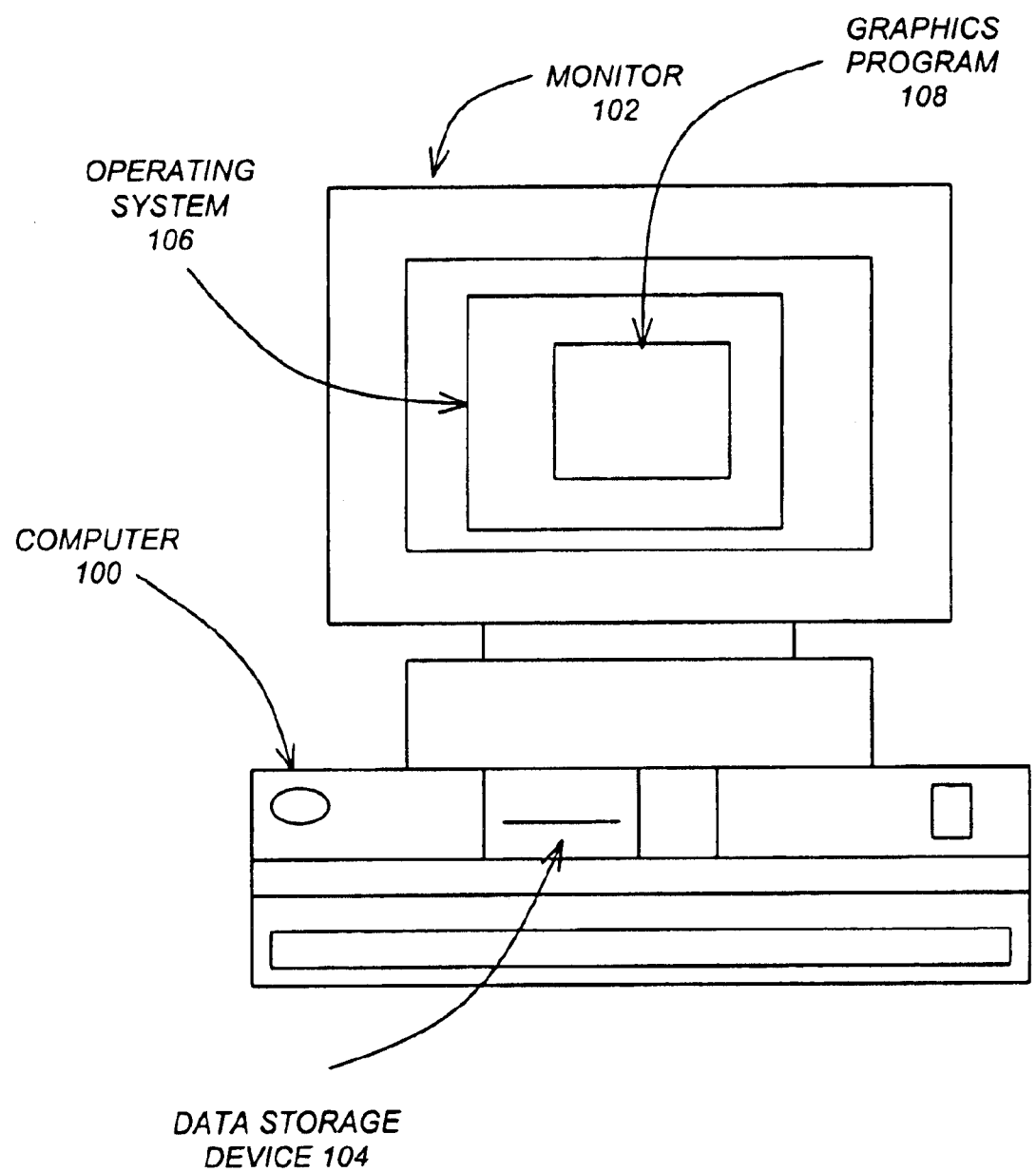
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106. The graphics program 108 preferably comprises a parametric feature-based solid modeling system, although other graphics programs 108 could be used as well.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
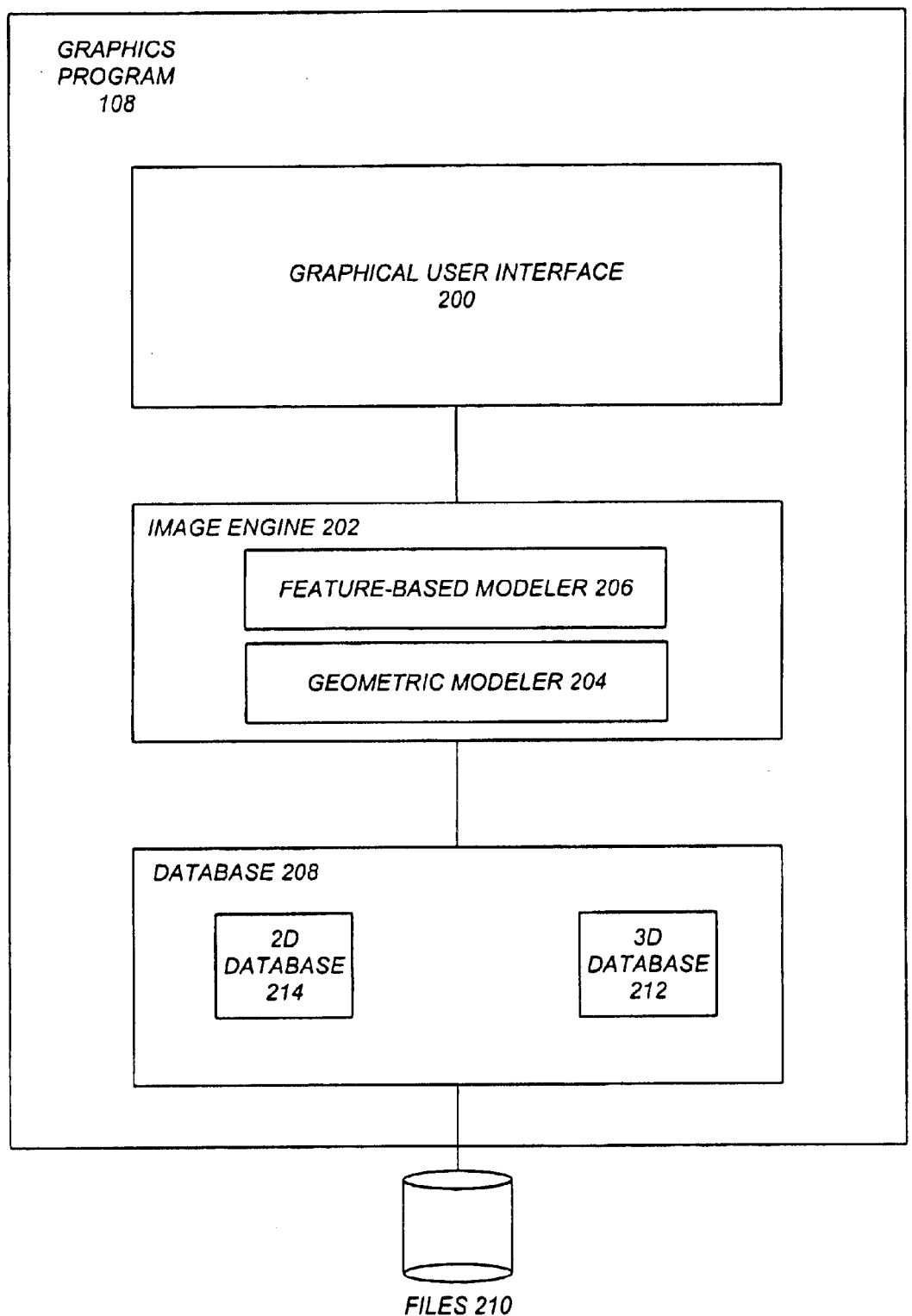
FIG. 2 is a block diagram that illustrates the components of the graphics program 108 according to the preferred embodiment of the present invention.

FIG. 2 is a block diagram that illustrates the components of the graphics program 108 according to the preferred embodiment of the present invention. There ate three main components to the graphics program 108, including: a Graphical User Interface (GUI) 200, an Image Engine (IME) 202 including a Geometric Modeler (GM) 204 and Feature-Based Modeler (FM) 206, and a Database (DB) 208 for storing objects in files 210.

The Graphical User Interface 200 displays information to the user and provides the functionality for the user's interaction with the graphics program 108.

The Image Engine 202 processes the Database 208 or files 210 and delivers the resulting graphics to an output device. In the preferred embodiment, the Image Engine 202 provides a complete application programming interface (API) that allows other computer programs to interface to the graphics program 108 as needed.

The Geometric Modeler 204 primarily creates geometry and topology for models. The Feature-Based Modeler 206, which interacts with the Geometric Modeler 204, is a parametric feature-based solid modeler that integrates 2D and 3D mechanical design tools, including parametric assembly modeling, surface modeling, 2D design, and associative drafting. The Feature-Based Modeler 206 provides powerful solid-, surface-, and assembly-modeling functionality.

The Database 208 is comprised of two separate types of databases: (1) a 3D database 212 known as the "world space" that stores 3D information; and (2) one or more 2D databases 214 known as the "virtual spaces" or "view ports" that stores 2D information derived from the 3D information. The 3D database 212 captures the design intent and behavior of a component in a model.

Object Structure

Figure 3:
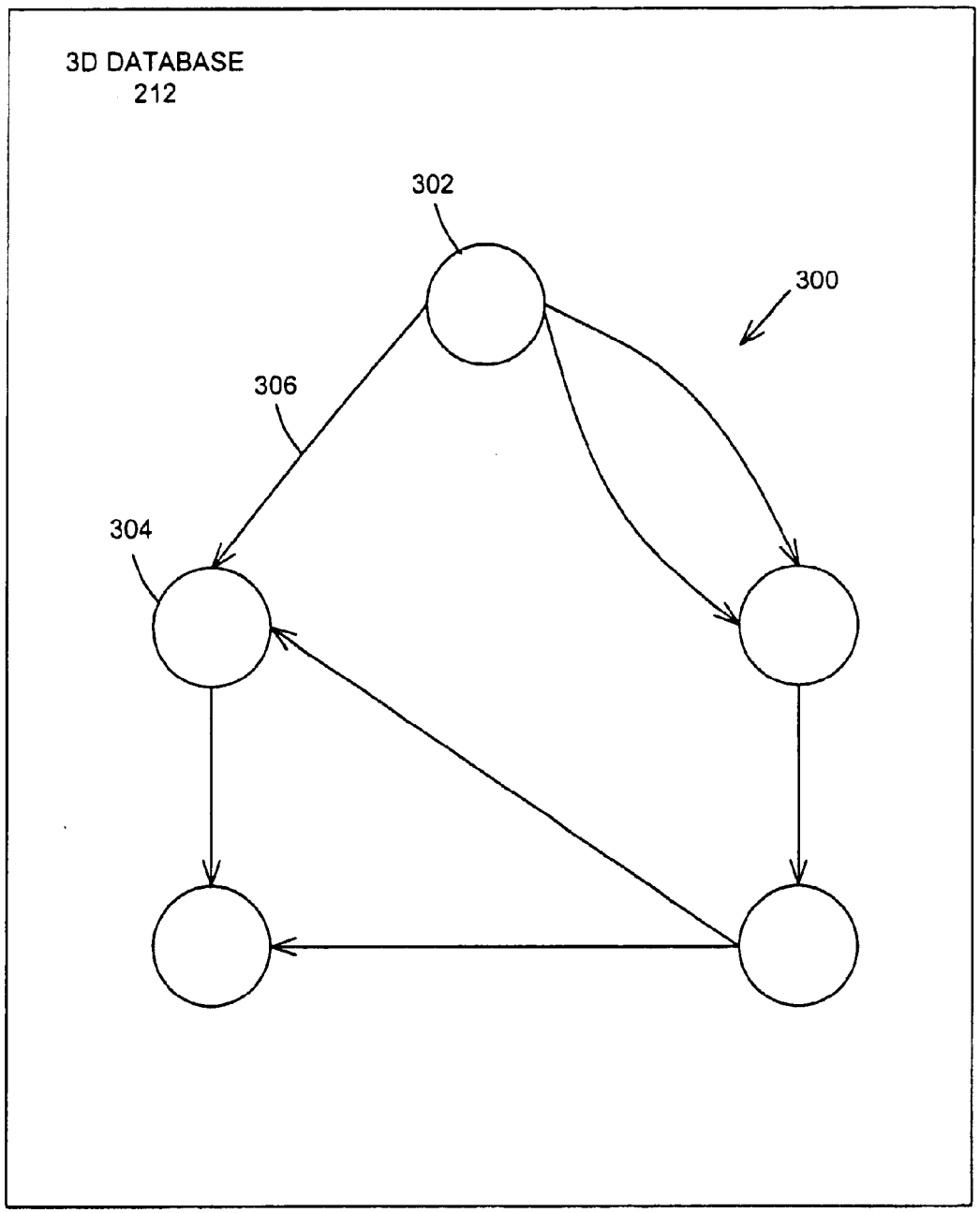
FIG. 3 is a block diagram that illustrates an object structure maintained by a three dimensional database according to the preferred embodiment of the present invention.

FIG. 3 is a block diagram that illustrates an object structure 300 maintained by the 3D database 212 according to the preferred embodiment of the present invention. Each object structure 300 includes a header node 302 and usually includes one or more nodes 304 connected by zero or more edges 306. There may be any number of different object structures 300 maintained by the 3D database 212. Moreover, a node 304 may be a member of multiple structures 300 in the 3D database 212.

Operation of the Preferred Embodiment

The purpose of sweeping profiles in the present invention is to shape an object structure 300 or node 304 that represents a mechanical part. There are other operations that shape the part, but sweeping, and especially the linear sweep (more commonly called an "extrude" operation), is the most basic.

A user typically draws a planar, simple (not self-intersecting) profile of curves and tells the graphics program 108 to sweep this profile along a specified path. The path may be implied: in a revolve operation, the path is a circular arc around some user-selected axis; in an extrude operation, the path is a line perpendicular to the plane of the profile.

Figure 4:
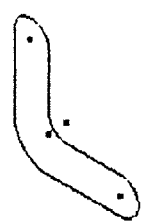
FIG. 4 illustrates a profile to be swept.
Figure 5:
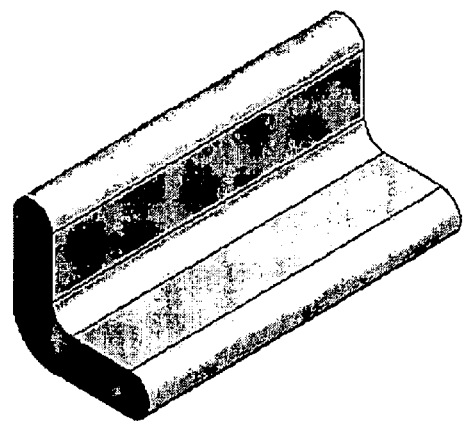
FIG. 5 illustrates a tool body generated by sweeping the profile.

FIG. 4 illustrates a profile to be swept and FIG. 5 illustrates a tool body generated by sweeping the profile. The sweeping of a profile along a path generates a solid called a "tool body". If this tool body is to interact with a solid already in the document, this second solid is called the "blank body". The user may choose to join the tool body to the blank body, remove the material in the tool body from the blank body, or intersect the material in the tool body with the blank body.

Figure 6:
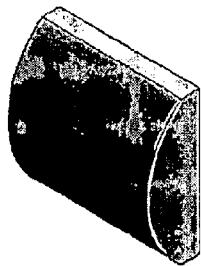
FIG. 6 illustrates a typical blank body (the object going to be operated on)
Figure 7:
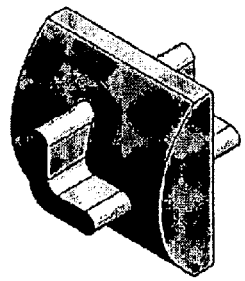
FIG. 7 illustrates a joining operation of the tool body with the blank body.
Figure 8:
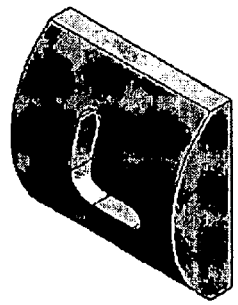
FIG. 8 illustrates a cutting operation of the tool body from the blank body.
Figure 9:
FIG. 9 illustrates an intersecting operation of the tool body with the blank body.

FIG. 6 illustrates a typical blank body (the object to be operated on), FIG. 7 illustrates a joining operation of the tool body with the blank body, FIG. 8 illustrates a cutting operation of the tool body from the blank body, and FIG. 9 illustrates an intersecting operation of the tool body with the blank body.

In the figures above, the tool body has a fixed length. Often, however, the user would like to explicitly state the extent to which a tool body interacts with the blank body. In the present invention, the choices for extruding a profile are:

Distance—As shown in FIG. 5, the tool body is generated by sweeping the profile, and the tool body extends to the user-defined length.

All—The tool body goes through the entire blank body, but no further.

To-next—The tool body extends to the first face on the blank body (the first face that completely cuts the tool body).

To-face—The tool body goes up to, but does not penetrate, the face selected.

From-to—The tool body is swept between two selected faces.

Other types of terminations can be used for other sweep types. For example, the user may specify a termination angle on a revolve sweep.

Figure 10:
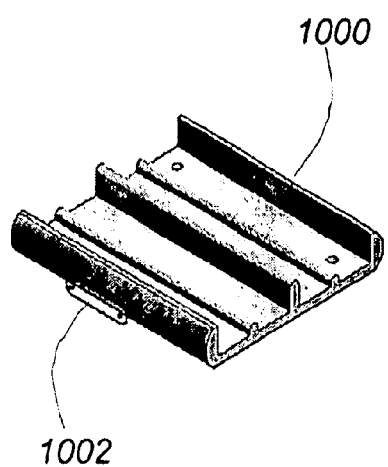
FIG. 10 illustrates the design of a section of track for sliding doors, which comprises a blank body, wherein the profile will be extruded through the blank body with "cut" to allow water drainage.
Figure 11:
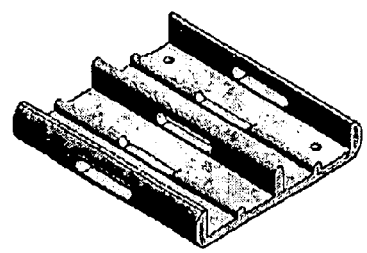
FIG. 11 also illustrates the blank body of FIG. 10, wherein a "through-all" termination (with "cut") is used to create the drainage slot.
Figure 12:
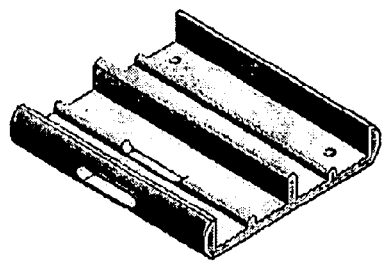
FIG. 12 illustrates the blank body of FIG. 10, wherein a "to-face" termination (with "cut") is used to restrict the drainage cut to one side, and the tool body is extended only to the face of the internal ridge (as shown by the removed material)
Figure 13:
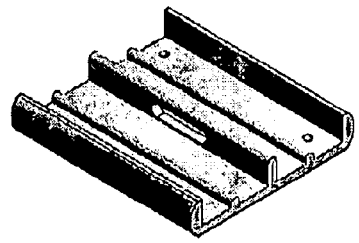
FIG. 13 illustrates the blank body of FIG. 10, wherein a "from-to" termination is used to cut the slot only in the central partition, and the two sides of the partition are selected as the from and to face.
Figure 14:
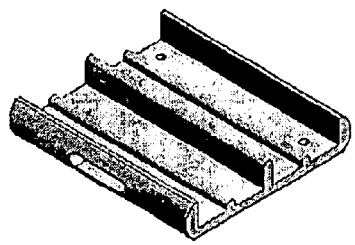
FIG. 14 illustrates the blank body of FIG. 10, wherein a "to-next" termination is used to cut through the first encountered face only.
Figure 15:
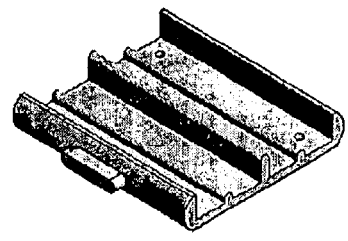
FIG. 15 illustrates the blank body of FIG. 10, wherein a join operation adds material to the track section, rather than a cut operation subtracting material (a "to-next" with "join" to create a bumper rather than a slot)

FIG. 10 illustrates the design of a section of track for sliding doors, which comprises a blank body 1000, wherein the body 1002 will be extruded through the blank body 1000 with "cut" to allow water drainage. FIG. 11 also illustrates the blank body of FIG. 10, wherein a "through-all" termination (with "cut") is used to create the drainage slot. FIG. 12 illustrates the blank body of FIG. 10, wherein a "to-face" termination (with "cut") is used to restrict the drainage cut to one side, and the tool body is extended only to the face of the internal ridge (as shown by the removed material). FIG. 13 illustrates the blank body of FIG. 10, wherein a "from-to" termination is used to cut the slot only in the central partition, and the two sides of the partition are selected as the from and to face. FIG. 14 illustrates the blank body of FIG. 10, wherein a "to-next" termination is used to cut through the first encountered face only. FIG. 15 illustrates the blank body of FIG. 10, wherein a join operation adds material to the track section, rather than a cut operation subtracting material (a "to-next" with "join" to create a bumper rather than a slot).

Sweeping Sheets (Surfaces)

In addition to creating a solid tool body that interacts with a blank body, the present invention allows one to create sheet bodies that remain disjoint from the solid. The same termination types are available for sheet as are available for solid terminations, but there is no concept of joining, cutting, or intersecting the sheet with the solid blank. Once created, sheets stand as separate objects from the blank body.

Figure 16:
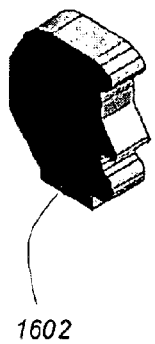
FIG. 16 illustrates the sweeping of sheets, wherein the line is the curve to be extruded to the solid.
Figure 17:
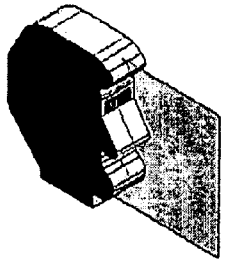
FIG. 17 illustrates the extrusion of the line to the solid.
Figure 18:
FIG. 18 shows the resulting sheet.

FIG. 16 illustrates the sweeping of sheets, wherein the line 1600 is the curve to be extruded to the solid 1602. FIG. 17 illustrates the extrusion of the line 1600 to the solid 1602, and FIG. 18 shows the resulting sheet.

Boundary Representations (B-Reps)

Solids are represented in the present invention by means of a boundary representation, although other types of solid representations such as "constructive solid geometry" (CSG) models (also called "combinatorial solid geometry" models) can be used without departing from the scope of the present invention. The boundary representation consists of a hierarchy of topological objects that define the boundaries of successively simpler elements of the model.

Each solid is composed of disconnected parts called "lumps." Most solids have only one lump, although most boundary representation models allow multiple lumps associated with them.

Figure 19:
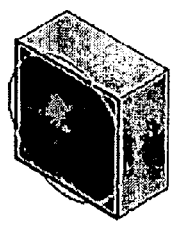
FIG. 19 illustrates how multi-lump bodies can be created by extruding a circular profile through a body with a "cut" operation.
Figure 20:
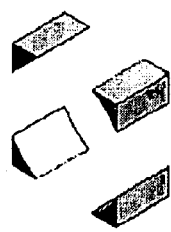
FIG. 20 illustrates the result of the cut operation, which is a multi-lump body.

FIG. 19 illustrates how multi-lump bodies can be created, e.g., by extruding a circular profile through a body with a "cut" operation. FIG. 20 illustrates the result of the cut operation, which is a multi-lump body.

Each lump contains one or more "shells." These shells are composed of a collection of faces that separates the inside portion of the lump from the outside. A lump can have several shells. There is typically an exterior shell which bounds the infinite void from the material, but there may also be interior shells which separate the material from pockets of empty space.

Each shell contains a set of one or more "faces." These faces are the infinitely thin boundaries between what is inside the solid and what is outside. A spherical lump might have only one face (on the one shell), or its surface might be chopped up into a patchwork of faces. A cube typically has six faces, but could have more if some of the sides are split.

Each face is required to be smooth in the sense that there are no sharp ridges in the interior of the face. Underlying each face is a surface that represents the geometry associated with the face. The surface gives the face structure.

In some b-rep models, there is a topological entity called a "half-face" that determines what side of the face is considered outside of the lump. Other b-rep models describe half-faces as special faces. When half-faces are present, the shells are comprised of half-faces, and the half-faces are associated to a face.

Each face is bounded by zero or more loops. A loop is to a face what a shell is to a lump. A spherical face might have no loops. The side of a block typically has one loop. A side of a cube with a round hole in it has two loops: one for the square outer boundary of the face, one for the round hole.

Each loop is comprised of multiple "half-edges" (often called "co-edges" or "fins"). These half-edges represent the usage of an edge (the next lower topological item) by a face. The half-edge answers the question "does the loop traverse an edge in the same parametric direction of the edge, or in the reverse direction?"

Associated with each half-edge is an "edge". One can think of an edge as being an infinitely thin wire. Each edge has a direction of traversal based on the underlying mathematical equation of the curve associated with the edge.

Edges are bounded by zero, one, or two "vertices." Vertices connect a physical point as a termination to an edge.

Figure 21:
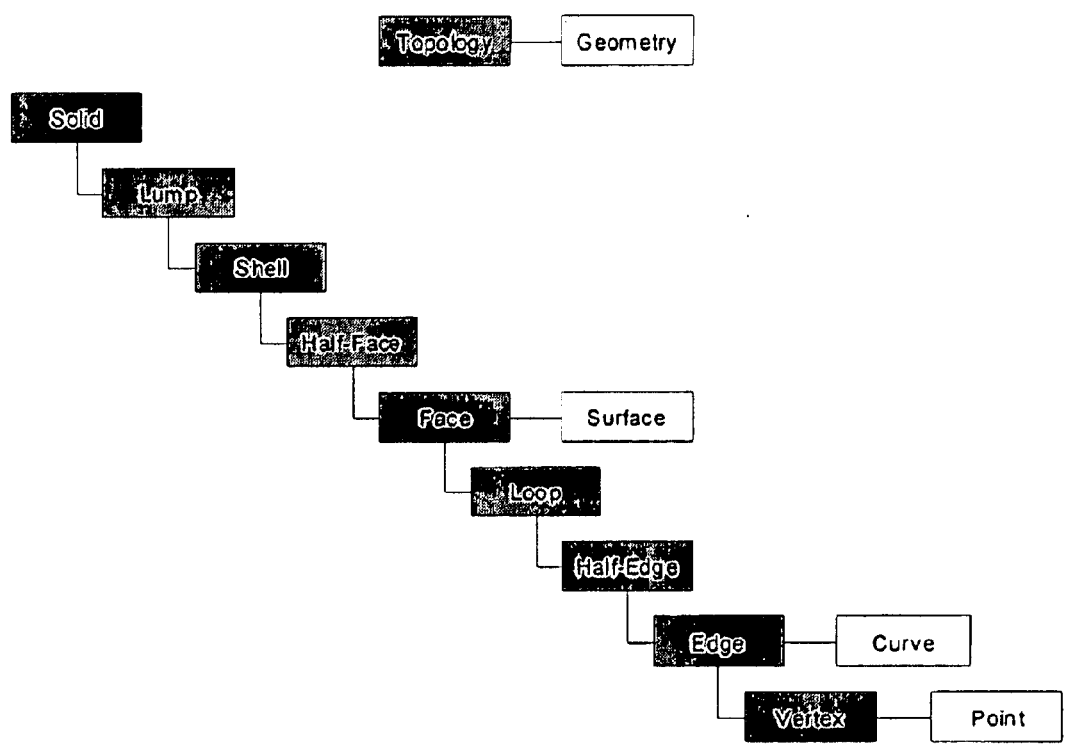
FIG. 21 is a chart that shows one possible hierarchy of topological entities used to represent a solid, and their associated geometry entities.

FIG. 21 is a chart that shows one possible hierarchy of topological entities used to represent a solid, and their associated geometry entities.

Attributes

The graphics program 108 has the ability to attach data to topological entities. Each such datum is usually called an "attribute." Attributes typically have programmable behaviors so that they can respond appropriately to common operations such as splitting, merging, copying, or transforming the entity to which they are attached.

For example, if one wishes to track how a certain face is split during a Boolean operation, one simply places an attribute on that face with the following behaviors:

Split behavior: Each resultant face gets a copy of the attribute.

Merge behavior: If either of the two faces being merged has the attribute, then the resultant face has a copy of the attribute.

Copy behavior: This behavior is not usually encountered in a Boolean operation.

Transform behavior: This behavior is not usually encountered in a Boolean operation.

After the Boolean operation is completed, all faces are examined to see which ones contain the attribute.

Suppose now it is desired to track two faces, one of type A and one of type B. One could create an attribute for each type one wishes to track, but a more compact way of doing it is to create an attribute (perhaps called AttribFaceTrack) with two Boolean data members (data items containing true or false, which are not to be confused with Boolean operation on solids). These data members can be distinct bits of a single machine word, for example, the first bit indicates whether the face is of type A, and the second bit indicates whether the face is of type B. The merge behavior could then be changed so that if each of the merging faces has an attribute of type AttribFaceTrack but with different faces indicated, the attribute on the resultant face has both faces indicated. After the Boolean operation, some faces will have no attribute of type AttribFaceTrack, some will have type A indicated, some type B, and others will possibly have type A and B indicated.

This multi-face tracking behavior will be used in a slightly more complex form to do the bookkeeping work in multi-body sweep terminations.

Cellular Topology

When speaking of the physical world, one expects that two bodies will not occupy the same space at the same time. In the symbolic world, there is no such restriction. When solids intersect, space is divided into the following types of disjoint regions: regions that are outside of both bodies (called "the void"); regions that are inside the first body, but outside the second; regions that are inside the second body, but outside the first; and regions that are inside both bodies. The disjoint regions, interior to at least one of the solids, are called "cells." There may be more than one cell of the same type.

Figure 22:
FIG. 22 illustrates, in two dimensions, how two disjoint regions form three types of regions.
Figure 22:
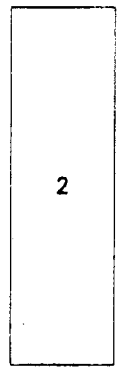
Figure 23:
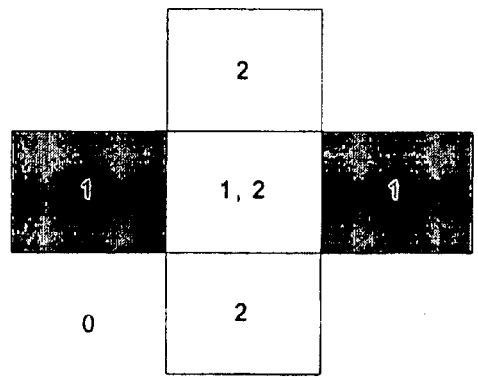
FIG. 23 illustrates the four types of regions formed when the regions intersect, wherein five cells are formed.

FIG. 22 illustrates, in two dimensions, how two disjoint regions form three types of regions (marked 0, 1, 2), while FIG. 23 illustrates the four types of regions formed when the regions intersect, wherein five cells are formed.

Two cells are called "adjacent" if they share at least one common face. In the two dimensional analogs that will be frequently used herein for illustration purposes (e.g., FIG. 23), cells will be adjacent when separated by a common edge.

From the cells of intersecting bodies and the notion of adjacency, one may use graph theory to generate a useful abstraction of the connectivity of the cells. Let each cell (other than the void cells) be represented as a vertex on the graph (not to be confused with the b-rep vertices) and let two vertices be connected by an edge (again, not a b-rep edge), if and only if the cells associated with those vertices are adjacent. The resulting graph is called a "cellular topology graph" or simply a "ct-graph." (Note that these graphs, and the nodes therein, are different from the object structures 300, and nodes 302 and 304, shown in FIG. 3.)

Figure 24:
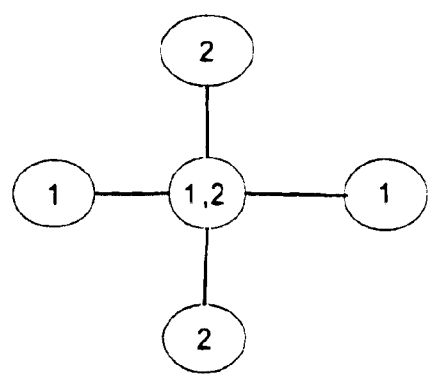
FIG. 24 illustrates a ct-graph for FIG. 23.

FIG. 24 illustrates a ct-graph for FIG. 23. Note that the ct-graph of FIG. 24 has been augmented by numbering the vertices thereof in accordance with their associated body or bodies.

Selective Boolean Operations

A "Boolean operation" between two bodies creates a new solid from portions of each body. The body being modified is the "blank body," and the body performing the modification is the "tool body." After a "join" Boolean operation, the blank body is modified to contain all the material from both the original blank body and the tool body. After a "subtract" Boolean operation, the entire material interior to the tool body is removed from the blank body. An "intersect" Boolean operation replaces the blank body with only that material that is in both the tool body and the original blank body.

Each of the Boolean operations types presented above can be represented in terms of cellular topology. A ct-graph is created for the intersecting bodies, and then a decision is made regarding which vertices of the ct-graph to keep. If a particular vertex is kept in the resulting ct-graph, then its associated cell is present in the resulting solid.

Figure 25A:
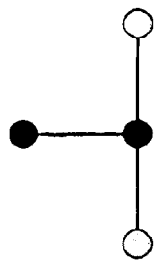
FIGS. 25A and 25B illustrate a selective Boolean operation that removes a cell from a ct-graph.
Figure 25B:
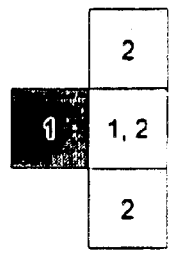

There may be times when operations other than the three above are needed. When this occurs, an algorithm may choose to do a "selective" or "partial" Boolean, in which the algorithm explicitly selects which vertices (and therefore which cells) ate kept. For example, perhaps it is desired to keep all the cells except the right most one. Removing one vertex from the ct-graph can do this. FIGS. 25A and 25B illustrate a selective Boolean operation that removes only one cell.

Single Body Terminations

This section describes handling of terminations where only a tool body and a single manifold blank body are involved. Explicitly, in "from-to" terminations, the "from" face and the "to" face must lie on the same body. The purpose of this section is to provide a simplified framework that can be extended to the multi-body cases that are the subject of this invention. Other single-body termination algorithms ate in use that may or may not be similar to that outlined here.

Figure 26:
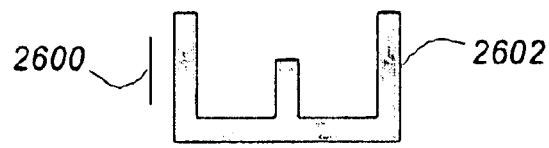
FIG. 26 illustrates an exemplary two-dimensional body.
Figure 27:
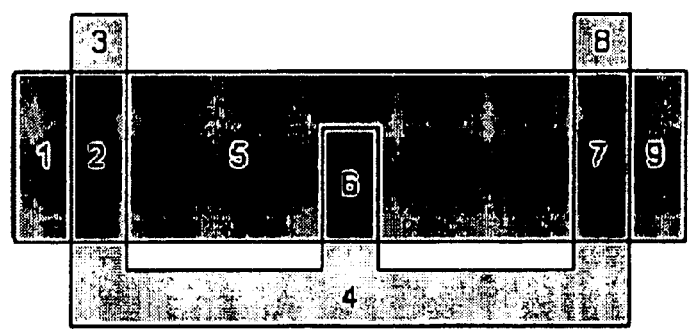
FIG. 27 shows a cell diagram associated with FIG. 26 when a tool body is swept through it.
Figure 28:
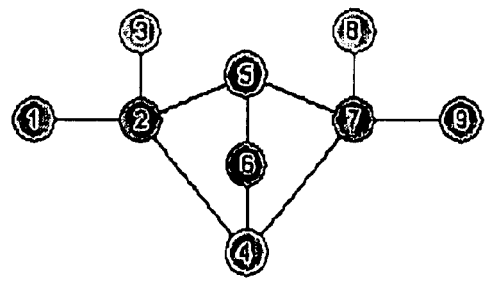
FIG. 28 shows a cellular-topology (ct) graph associated with FIG. 26.

Consider the 2-D body in FIG. 26 (2-D bodies are sufficient for discussion since the 3-D cases are completely analogous). Suppose the profile 2600 is swept through the body 2602 to form a tool body. FIG. 27 shows the associated cell diagram and FIG. 28 shows the associated ct-graph.

Figure 29:
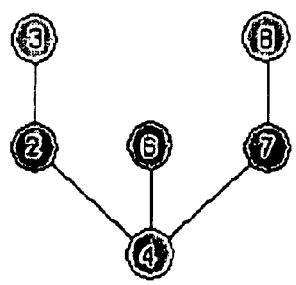
FIG. 29 illustrates the graph of vertices associated with cells internal to the blank body that is referred to as the "blank body graph" or "blank graph"
Figure 30:
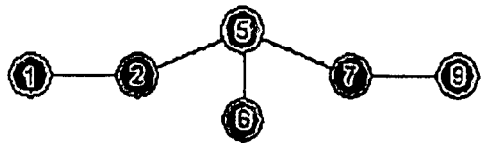
FIG. 30 illustrates the graph of vertices from the ct-graph whose associated cells are internal to the tool body that is called the "tool body graph" or simply the "tool graph"

There are two important sub-graphs of the ct-graph that will be needed for further analysis. FIG. 29 illustrates the graph of vertices associated with cells internal to the blank body that is referred to as the "blank body graph" (or "blank graph"). Likewise, FIG. 30 illustrates the graph of vertices from the ct-graph whose associated cells are internal to the tool body that is called the "tool body graph" (or "tool graph"). Some vertices belong to both the tool body graph and the blank body graph; these are precisely the vertices associated with the intersection of the two bodies.

Figure 31:
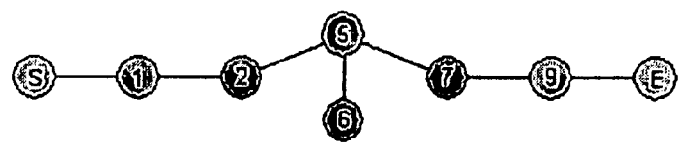
FIG. 31 illustrates how termination vertices contain either an "S" for the start termination or an "E" for the end termination.

For open path sweeps (the only kind under consideration, since closed path sweeps may be explicitly opened once it is determined that a termination is desired), there is a starting face on the tool body and an ending face. All other faces are call "lateral faces." It is useful to keep track of which cells are attached to the starting face and which to the termination faces in the ct-graph. This is done by attaching a "termination vertex" to all vertices of the ct-graph that are associated with a cell containing a start face, and a termination vertex to all those vertices containing an end face. Termination vertices contain either an "S" for the start termination or an "E" for the end termination (as shown in FIG. 31, which illustrates a tool body graph decorated with termination vertices).

Terminations on closed paths reduce to the open path case by removing an appropriate edge of the tool graph and connecting start and end vertices to those vertices formerly on the removed edge. That the closed-path ct-graph can be turned into an open path ct-graph is reasonable since the user's intent is to either use the whole path (in which case there is no termination analysis) or use some subset of the path shorter than the entire length.

When the tool body graph is decorated with termination vertices, it is also called the tool body graph. Although ambiguous, no confusion should occur, since once the termination vertices are added, there is no cause for further use of the undecorated version.

"All" Terminations

"All" terminations usually occur in two flavors: one-directional (where the user chooses the direction) or two-directional.

Assuming the tool body length is chosen, such tool body completely passes through the blank body, using the ct-graph makes selection of the result trivial. In the one-directional case, the algorithm need only keep those cells associated with vertices not attached to the end termination vertex. In the two-direction case, the algorithm need only keep the cells associated with those vertices not attached to either termination vertex.

"To-next" Terminations

The intent behind "To-next" terminations is that the tool body be extended to the first complete termination that effects a change in the body.

The first step in accomplishing this is to associate an integer representing the minimum number of steps that must be traversed from the start termination vertex with each vertex of the tool graph. This integer is the "distance" from the start vertex. The distance from the start termination vertex to itself is 0. The distance from the start termination vertex of any vertices adjacent to the start vertex in the tool graph is 1.

For solid extrusions, the next step is to extract from the tool graph the vertices of distance 1 or 2 from the start vertex (other than those that are adjacent to the end termination vertex, as these cells must always be removed, since they are an artifact of extending the tool body beyond the bounds of the blank body). This choice of vertices (and by extension the cells) is justified by the observation that if a distance 2 vertex is interior to the blank body (in the sense that its associated cell is), any distance 1 cells adjacent to it are exterior. On the other hand, if the distance 2 vertex is exterior, its adjacent distance one cells are interior.

For sheet extrusions, only the distance 1 vertices are extracted (again, other than those adjacent to the end termination vertex).

Figure 32:
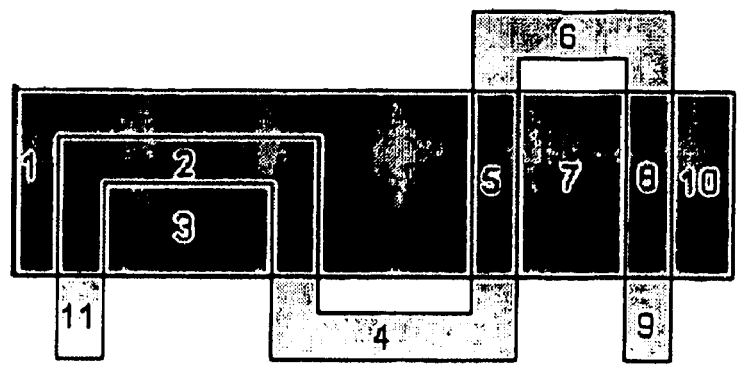
FIG. 32 illustrates an initial tool and blank body for to-next terminations.
Figure 33:
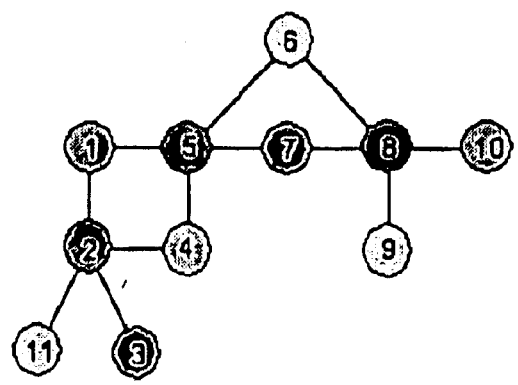
FIG. 33 illustrates a ct-graph for FIG. 32.
Figure 34:
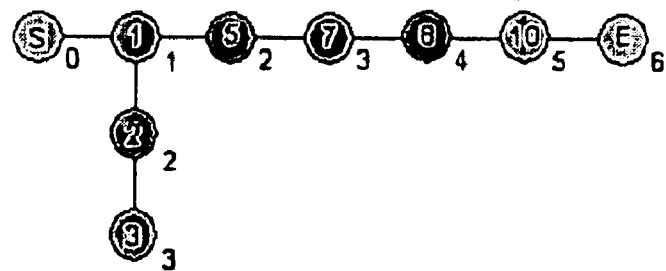
FIG. 34 illustrates a tool body graph with vertex distances from "S" written as subscripts.

FIG. 32 illustrates an initial tool and blank body for to-next terminations. FIG. 33 illustrates a ct-graph for FIG. 32. FIG. 34 illustrates a tool body graph with vertex distances from "S" written as subscripts.

Figure 35:
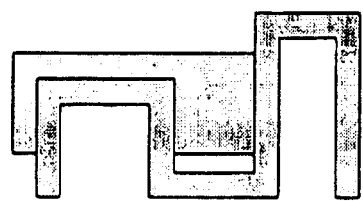
FIG. 35 illustrates the results of a to-next join operation on FIG. 32.
Figure 36:
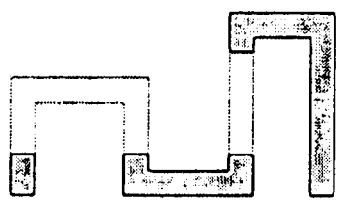
FIG. 36 illustrates the results of a to-next cut operation on FIG. 32.
Figure 37:
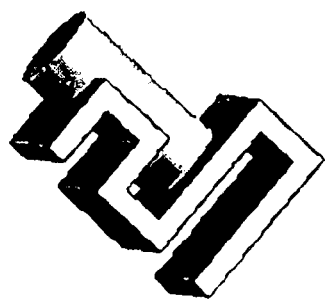
FIG. 37 is a 3-D analog of FIG. 35.
Figure 38:
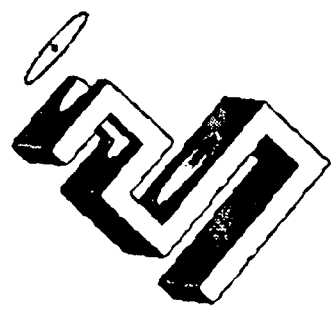
FIG. 38 is a 3-D analog of FIG. 36.

FIG. 35 illustrates the results of a to-next join operation on FIG. 32, while FIG. 36 illustrates the results of a to-next cut operation on FIG. 32. FIG. 37 is a 3-D analog of FIG. 35, while FIG. 38 is a 3-D analog of FIG. 36.

Figure 39:
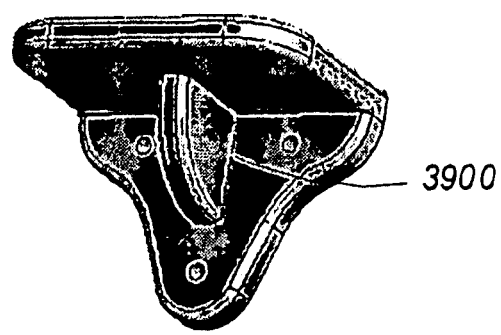
FIG. 39 illustrates a "revolve" example, wherein a profile is swept from the wall mount to the bottom face of the shelf.

FIG. 39 illustrates a "revolve" example, wherein a profile 3900 is swept from the wall mount to the bottom face of the shelf.

"To-face" Terminations

In the "to-face" termination, the user selects a face of the blank body to which the tool body is to be terminated. The face by itself may not completely cut through the tool body, but perhaps the selected face together with some neighboring faces allow sense to be made of this situation. This can be more clearly defined using cellular topology methods.

Each vertex of the ct-graph corresponds to a solid cell. Each edge of the ct-graph corresponds to the collection of faces that separate one cell from its adjacent cell. In the case of the termination vertices, the edges represent the termination faces themselves. The primary idea behind to-face terminations is to find the graph edges that contain the face that the user selected.

One difficulty that arises is that, in the process of creating the cells from the original bodies' faces, the face selected as the to-termination may be split into multiple faces, such that each side of every face is on the boundary of at most one cell. Thus, a tracking mechanism is necessary to keep track of all faces split from the original one. One can thus place an attribute (as defined previously) of type "to-face" on the face that the user selected. When the cells are created, any face that contains this attribute will be considered a valid termination candidate. Other methods of tracking which faces are to be used as terminations faces may be implemented without deviating from the scope of this invention.

Recalling that a ct-graph edge represents all faces separating two adjacent cells, the system defines an edge of the tool graph to be "acceptable as a to-face termination" if: (1) it contains a face flagged with the to-termination attribute (i.e., a face split off from the original selected termination face) or some other tracking mechanism, and (2) removal of that edge would cause the tool graph to be split into two disconnected pieces (called "components") such that one component includes the start termination vertex, and the other contains the end termination vertex. An edge whose removal splits a graph into two components is called a "bridge".

If there are multiple graph edges that meet the stated criteria, either explicit user selection or a heuristic can be used to differentiate between them. One embodiment of the present invention may allow explicit user selection, while another embodiment may also use a heuristic called the "maximal principle" that chooses the termination that causes the most number of cells to be included in the tool body. Other heuristics are possible within the scope of this invention.

"From-to" Terminations

From-to terminations are computed very much the same as to-face terminations. The main difference is that a "from" tool body graph edge must be selected as well as a "to" edge.

Like the to-termination graph edge, the from-termination graph edge must be associated with a face tracked as a "from-face," be a bridge of the tool graph, and must separate the start and end termination vertices. After selection of the from-edge and to-edge, the portion of the tool graph kept is the portion that does not contain either a start or an end termination vertex.

As for "to-face" terminations, an attribute may decorate the "from" face to track it through the partial Boolean operations, or some other tracking mechanism may be used. It is possible that a single face on the blank body be designated as both a "from" and a "to" face.

Post Processing

Once a particular sub-graph of the tool graph is chosen according to the termination type and ambiguity resolution heuristics, the vertices of the terminated tool graph are united, subtracted or intersected with those the blank graph. The resulting graph determines which cells are output by the termination algorithm.

Overview of the Multi-Body Termination Algorithm

In the handling of single-body terminations, a solid tool body operates on a blank body according to a termination type and Boolean operator (join, cut, intersect). Alternately, a sheet tool body may, by terminating to a blank body, create a new sheet body as a subset of the input tool body.

The situation becomes significantly more complex with multi-body terminations. The most complex scenario occurs when a tool body is terminated from a face on a body (called the "from-body") to a face on another body (called the "to-body"). A Boolean operation is then applied against a third body (called a "target-body"). Complexity rises when one realizes that the from-body, to-body and target-body can all intersect in non-trivial ways.

Figure 40:
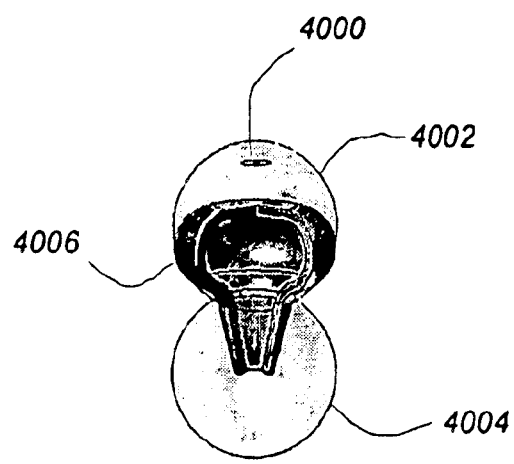
FIG. 40 illustrates a multi-body termination.

FIG. 40 illustrates a multi-body termination of the most complex type. The circular profile 4000 is to be extruded from the top spherical surface 4002 to the bottom spherical surface 4004 and united with the cutaway solid body 4006. Note that all three bodies 4002, 4004, 4006 intersect in every possible combination.

Figure 41:
FIG. 41 illustrates that the correct tool body is created as a termination from one sphere to the other.

FIG. 41 illustrates that the correct tool body is created as a termination from one sphere to the other. The termination is ambiguous (there are four possible solutions), and the maximal heuristic is evoked.

Various combinations can occur: there may be no from-body or to-body (as when the user is doing a "to-next" termination); any combination of the from-body, to-body or target-body may actually be the same body; and any of these three bodies may be missing (depending on the operation).

Phases

Figure 42:
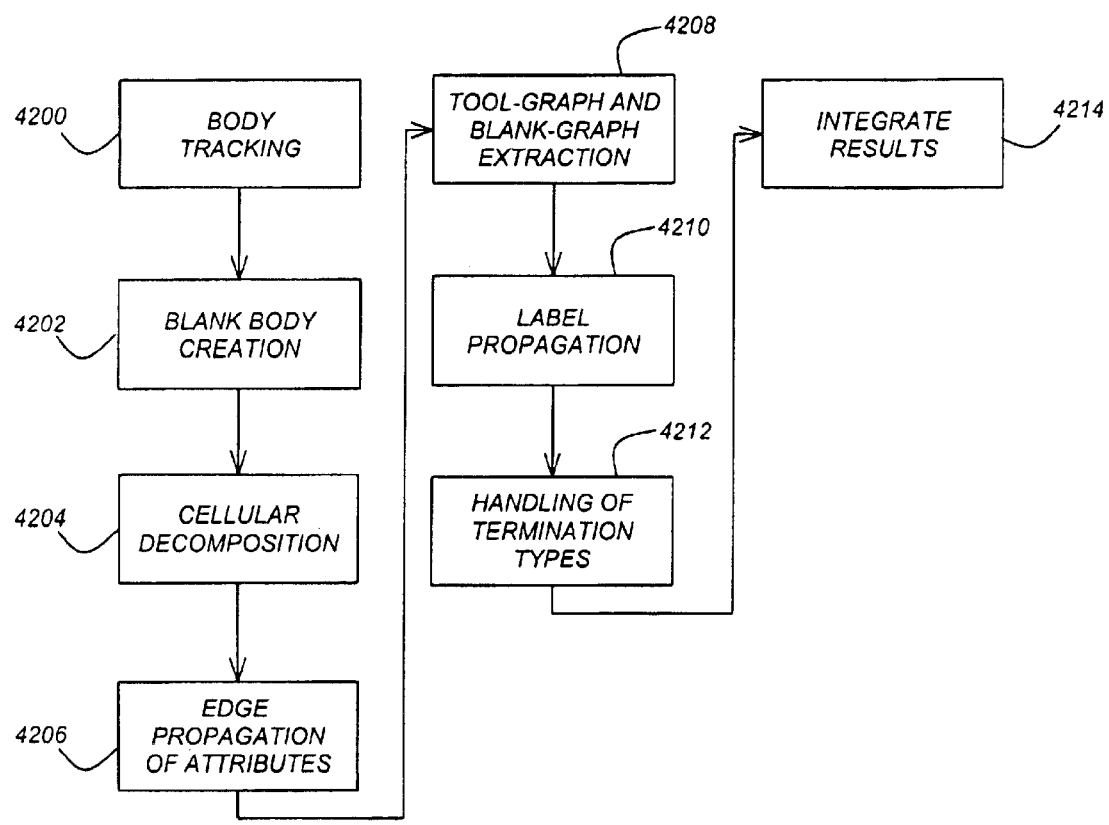
FIG. 42 is a flowchart that illustrates the multi-body termination algorithm according to the preferred embodiment of the present invention.

FIG. 42 is a flowchart that illustrates the multi-body termination algorithm according to the preferred embodiment of the present invention. The multi-body termination algorithm can be split into three phases, which are represented by the three columns of Blocks in FIG. 42.

The first phase, represented by Blocks 4200, 4202, 4204, and 4206 in the first column, is known as the "preprocessing" phase. The preprocessing phase is responsible for labeling all faces (and possibly edges when sheets ate being swept) according to the body from which they come. This labeling may be done with attributes as described above, or some other means of tracking may be used. The preprocessing phase is also responsible for the construction of a blank body. In single-body terminations, the blank body is always available: if it exists at all; it is simply the target-body. In multi-body terminations, a blank body must be constructed from some combination of a from-body, to-body and a target-body. Another responsibility of the preprocessing phase is to perform cellular decomposition and generate a ct-graph for the blank body. The final responsibility of the preprocessing phase is to propagate edge attributes when creating sheets.

The second phase, represented by Blocks 4208, 4210, and 4212 in the second column, is known as the "analysis" phase. In this phase, all graph-based analysis takes place, including extracting the tool and blank graphs; adding termination vertices to the tool graph; and deriving new graphs (called "bundle graphs") from the tool graph that are used to determine the potential "from" and "to" terminations. Another important function of the analysis phase is an operation called "label propagation," in which the marking of faces as a from-face or to-face are propagated to faces adjacent to those faces originally marked. This topic will be discussed in detail in a subsequent section. The output of the analysis phase is a graph whose vertices represent the cells that will be used by the final phase to create the output body.

The final phase, represented by Block 4214 in the third column, is the "post processing" phase. This is where the results of the analysis are integrated into a final result according to the desired Boolean operation.

Preprocessing

Step 1—Body Tracking (Block 4200 in FIG. 42)

It is important to track which faces came from which termination body (the to-body or the from-body) even after the cellular decomposition. This is typically done using attributes although other tracking mechanisms may be used within the scope of this invention. In from-to or to-face terminations, all faces on the body containing the to-face are marked with a "to-body" attribute. In from-to terminations, all faces on the body containing a from-face are marked with a "from-body" attribute. This allows faces to be identified according to which body they came from after the faces have been split or merged in the process of cellular decomposition.

Step 2—Blank Body Creation (Block 4202 in FIG. 42)

For "all" or "to-next" terminations, the blank body is simply the target body. Although the present invention only allows the target body to be used in this termination type, other implementations could extend this functionality by joining multiple bodies together to form a single non-manifold blank body.

For "to-face" or "from-to" terminations, the situation is a bit more complex. In these cases, the blank body is created from some combination of the from-body, to-body, and target-body.

Figure 43:
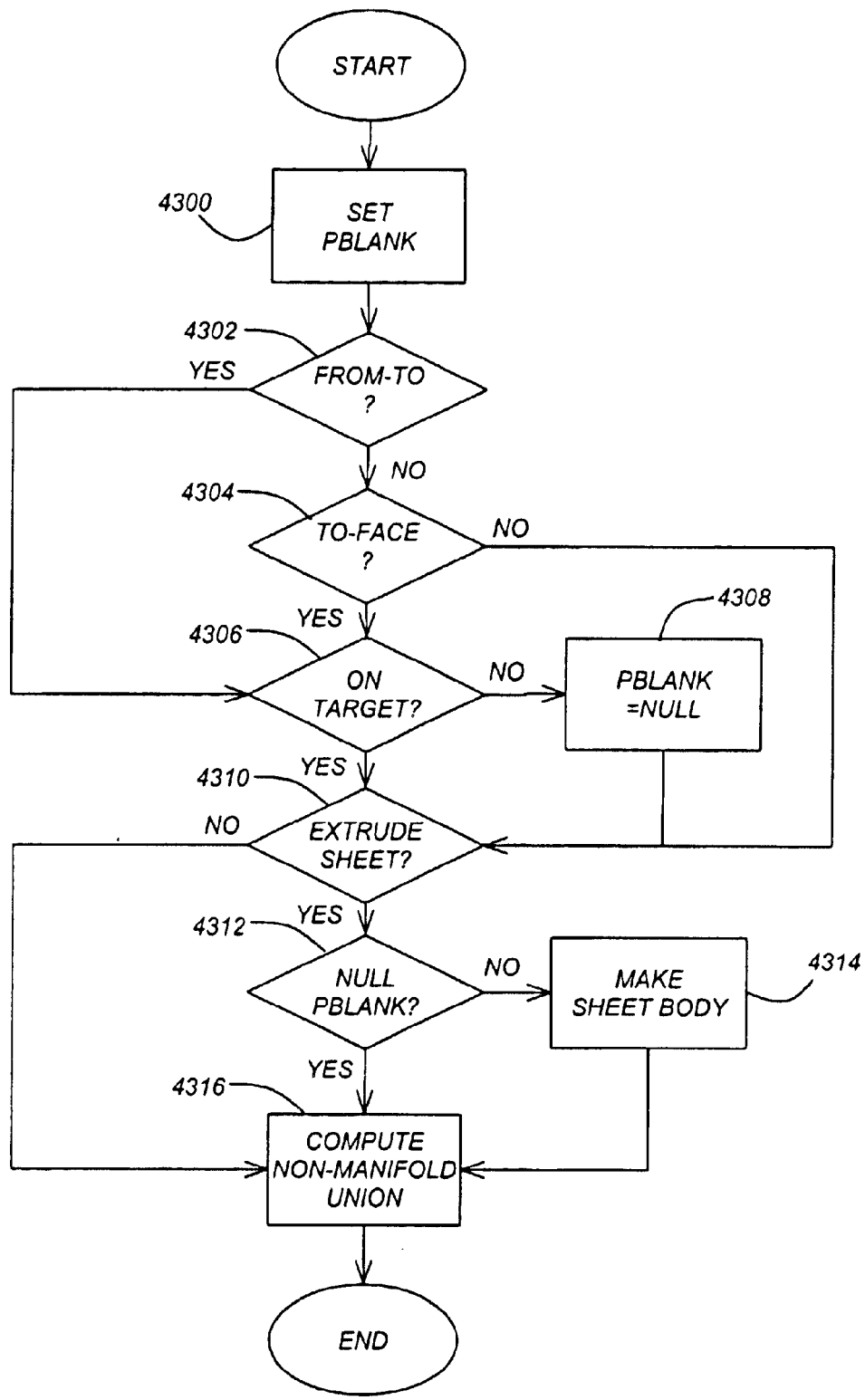
FIG. 43 is a flowchart for generation of the blank body in "from-to" or "to-face" terminations.

FIG. 43 is a flowchart for generation of the blank body in "from-to" or "to-face" terminations.

Block 4300 represents the graphics program 108 setting the blank body pointer (pBlank) to the target body (pTarget). pTarget may be null.

Block 4302 is a decision block that represents the graphics program 108 determining whether this is a from-to termination. If so, control transfers to Block 4306; otherwise, control transfers to Block 4302.

Block 4304 is a decision block that represents the graphics program 108 determining whether this is a to-face termination. If so, control transfers to Block 4306; otherwise, control transfers to Block 4310.

Block 4306 is a decision block that represents the graphics program 108 determining whether either the from or to faces are on the target body. If not, control transfers to Block 4308; otherwise, control transfers to Block 4310.

Block 4308 represents the graphics program 108 setting the blank body pointer (pBlank) to null, which indicates that a terminated tool body can be generated without the target body.

Block 4310 is a decision block that represents the graphics program 108 determining whether one or more sheets are being extruded. If so, control transfers to Block 4312; otherwise, control transfers to Block 4316.

Block 4312 is a decision block that represents the graphics program 108 determining whether pBlank is null. If not, control transfers to Block 4314; otherwise, control transfers to Block 4316.

Block 4314 represents the graphics program 108 indicating that there is a solid target body to terminate to, but a sheet body is needed, and thus the target body is made a sheet body (it might be necessary to copy it first to preserve the original). One may think of this conversion as a "hollowing out" of the solid, so that only the infinitely thin surfaces remain. This process is necessary because a non-manifold unite operation between a solid body and a sheet tool body causes portions of the tool body interior to the solid to be lost. There is no such loss when the surface of the solid blank body is extracted as a sheet blank body, and that sheet blank body is united with the sheet tool body.

Finally, Block 4316 represents the graphics program 108 computing the non-manifold (non-regular as defined below) union of the from, to, and blank bodies (using the blank body computed above), while excluding any of these bodies that are undefined (null), wherein the result is the blank body to be used in the analysis phase.

Examining the flowchart reveals that for from-to or to-face terminations, if the to-body and from-body are both distinct from the target-body, the target body is not used at all in the creation of the blank body. What happens in this case is that the result of the termination process yields a truncated tool body, which is subsequently Booleaned with the target-body to form the final product. Doing this saves time because the blank body is simpler, which results in less work for the graphics program 108 when performing cellular decomposition and final construction from the selected cells. Keeping the blank body simple also reduces the chance of a modeling error due to the resulting complexity. This is an optional optimization that might not be implemented in all realizations of this invention.

Another point that can be gleaned from the flowchart is that, in the case of sheet tool bodies, the target-body must be turned into a sheet body. If the actual target-body should not be changed for when extruding sheets, a copy can be made before the conversion. This can be optimized so that the conversion of the target body to a sheet body is only done if the target body will ultimately be used in the blank body (pBlank !=Null).

It is important to note that when the various bodies are joined to form the blank body, a non-regular Boolean join operation is performed. "Non-regular" refers to the fact that any faces internal to the body are not discarded. This is important since some of these faces may be part of the termination.

Step 3—Cellular Decomposition (Block 4204 in FIG. 42)

In this step, the graphics program 108 performs cellular decomposition on the tool body and blank body. The result of this operation is a ct-graph.

Step 4—Edge Propagation of Attributes (Block 4206 in FIG. 42)

This step is only required when creating sheets. The label attributes on each face (to-face/from-face attributes, to-body/from-body attributes) should be copied from each face to the edges of those faces. Unlike the cellular decomposition of two solids where cells are adjacent if they share a common face, two sheet cells are adjacent if they share a common edge.

Analysis

Step 1—Tool Graph and Blank Graph Extraction (Block 4208 in FIG. 42)

The first step of the analysis phase is to extract the tool and blank graph from the ct-graph. The blank graph is created for the benefit of the post-processing phase to form an output body.

Unlike the single body case, the blank graph may have both 3-D and 2-D cells, because the blank body is possibly a union of a 3-D target body and one or two 2-D termination bodies. Since the 2-D cells are not output in the final body, they may be removed from the blank graph.

If sheets are being swept, there is no need for a blank graph.

Step 2—Label Propagation (Block 4210 in FIG. 42)

In the case of single body terminations, if two adjacent vertices in the ct-graph both contain a common face marked as a from-face or a to-face (or more precisely, if the cells associated with these vertices contain such a common face, which is a distinction that will be largely ignored from this point on), then the graph edge between the vertices may be marked as a potential termination edge. Under certain conditions, this edge could be used as a termination of the tool body. In the case of multi-body extrusions, however, things are more difficult because of possible intersections in the blank body.

Figure 44:
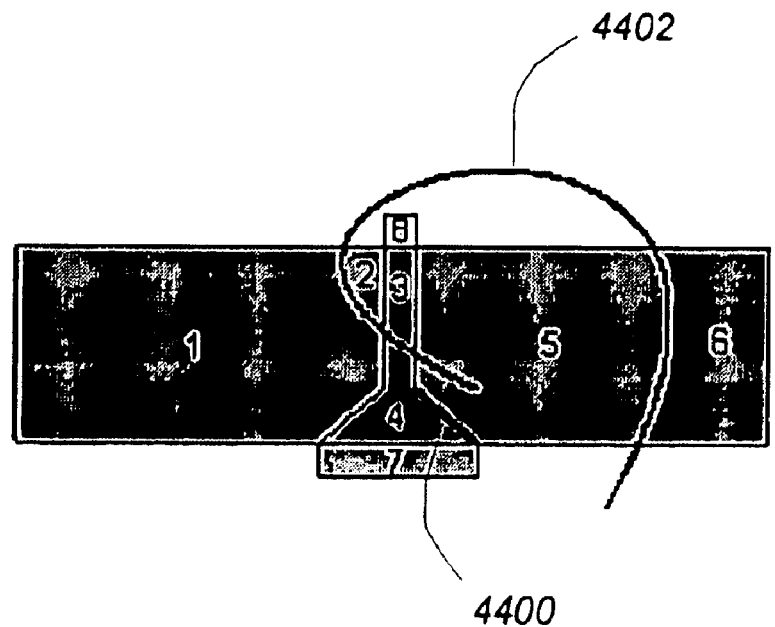
FIG. 44 is a cell diagram of a from-to termination where the from-body is different from the to-body.
Figure 45:
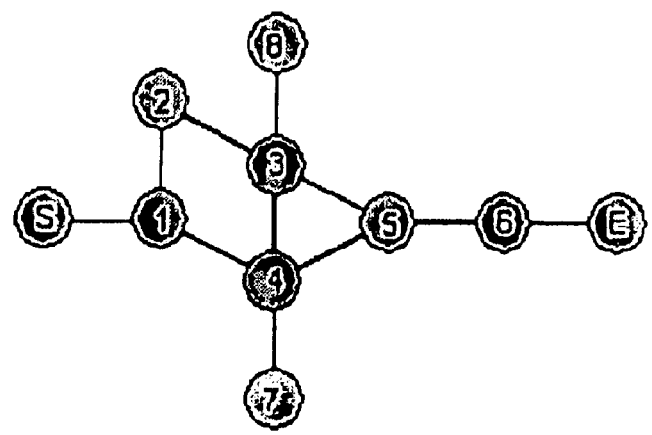
FIG. 45 illustrates a ct-graph for FIG. 44.

Consider the multi-body termination in FIG. 44. FIG. 44 is a cell diagram of a from-to termination where the from-body (containing face 4400) is different from the to-body (containing only face 4402), and FIG. 45 illustrates a tool graph for FIG. 44. The single faced to-body is represented as a curve, but one may imagine in 3-D that it is a surface. In this figure, the user has selected face 4400 as the from-face, and 4402 as the to-face. It is then clear that edge 4-5 is a from-termination, but that edge is not a bridge of the graph. The user also intended (by extension) that edge 3-5 also be a from-termination edge. In fact, that vertices 3 and 4 are split at all is an artifact of the multi-body termination; it only happens because the to-body 4402 intersects the from-body 4400. The process of label propagation fixes this problem by copying the from-face and to-face attributes to adjacent faces on the same body, provided those faces are not marked as coming from the tool body. One possible method of doing this follows:

1. Create a container (a data structure in which multiple data items can be stored) for pointers to all the faces in the tool graph that are not marked as coming from the tool body itself. Call this container "graphFaces".
2. Create a container for pointers to those faces marked as either from-faces or to-faces. Call this container "flaggedFaces".
3. Create an empty container called "newFlaggedFaces".
4. For each face pointer pFace in flaggedFaces, find all its adjacent faces.
    a. For each adjacent face pointer pAdjFace
        i. If pAdjFace is not in graphFaces, it is of no interest. Go to 4.a.iv.
        ii. If pAdjFace is already marked with the same termination type as pFace, it has already been handled or is in flaggedFaces waiting to be handled, so there is no need to process it. Go to 4.a.iv.
        iii. If pAdjFace is not from the same original body as pFace, then it can't be a natural extension of pFace. Go to 4.a.iv.
        iv. If pAdjFace has made it this far, it is a natural extension of pFace. Mark pAdjFace as the same termination face type as pFace.
        v. Add pAdjFace to newFlaggedFaces.
        vi. Get the next adjacent face. If no more, go to 5, otherwise go to 4.a.
5. If newFlaggedFaces is not empty, swap flaggedFaces and newFlaggedFaces. Then empty newFlaggedFaces. Go to 4.
6. Done.

In the case where one is sweeping surfaces, the procedure above should be applied to edges rather than faces of a tool body.

Step 3—Handling of Termination Types (Block 4212 in FIG. 42)

"All" Terminations

In solid modeling, all terminations are usually relative to a single solid body. Even when the termination is relative to multiple bodies, a non-regular unite of those bodies gives an appropriate blank body to which one may apply the single-body procedure. (See the section above on single body terminations.)

As in the single-body case, all cells connected to the appropriate termination vertices are removed from the tool graph.

"To-Next" Terminations

This termination type is also performed against a single solid body. Extending this type to multiple bodies is trivial if all the bodies are all solid or all sheet bodies. One must simply union the bodies together and derive a terminated tool body. That terminated body can then be united with one or more of the original bodies, or kept as a new body. The graph distance rules apply equally well here (distance 1 and 2 cells ate kept in the solid tool body case, and distance 1 cells are kept in the sheet tool body case).

If solid and sheet bodies are combined to form a blank body, the distance rules become less clear and the situation more ambiguous. Rules can be created that depend on what is to be done with the tool body. For example, if the tool body is solid and is to be Booleaned with the solid portion of the blank body, all 2-D cells of the blank body can be discarded and the distance 2 rule can be applied. If a new body is to be output (as is often the case in extruding sheets), perhaps the distance 1 rule is more appropriate. Other situations may require other decisions.

"From-To" Terminations

A difficulty arises with multi-body terminations when attempting to use the technique described in the section on the single-body method. The problem is that viable solutions are missed due to the fact that the condition that an acceptable termination be a bridge edge in the tool body graph breaks down, as shown in FIGS. 46, 47, 48, and 49. One sees that the cause of this problem is the potential interference of the from-body and to-body, which may intersect to form a non-manifold blank body.

Figure 46:
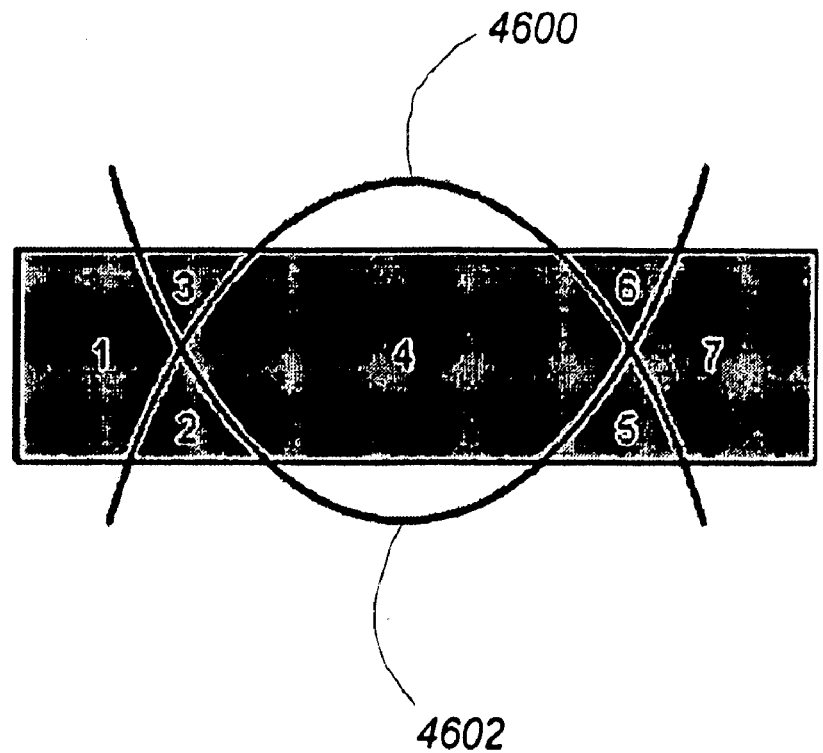
FIG. 46 illustrates cellular decomposition for a swept tool body (represented as a rectangle) and a pair of surfaces (represented as two curves) to be used as terminations.
Figure 47:
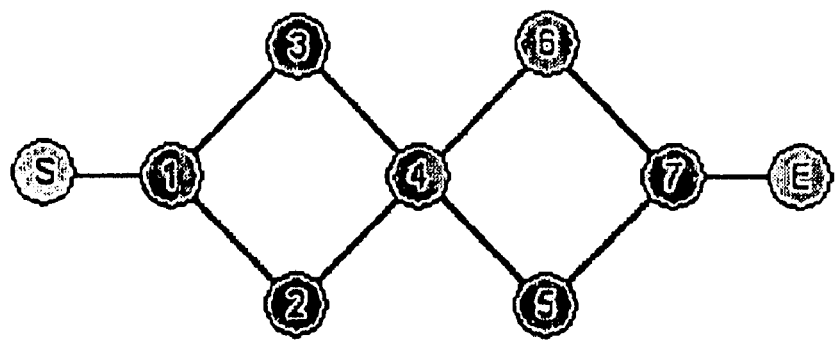
FIG. 47 is a tool body graph for FIG. 46.
Figure 48:
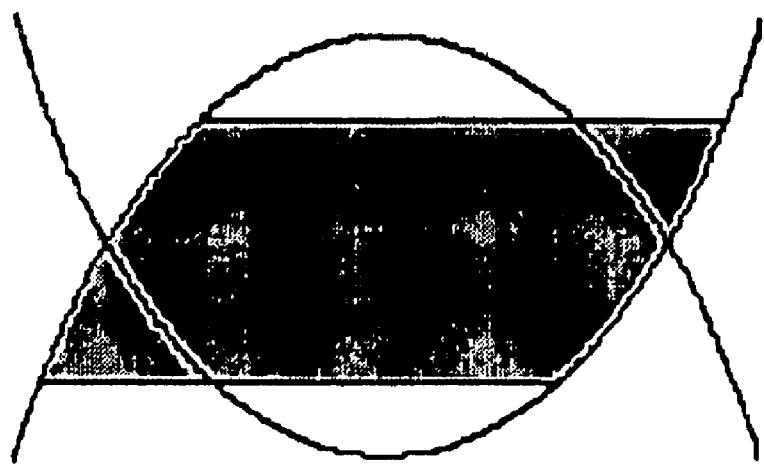
FIG. 48 shows one possible termination for FIG. 47.
Figure 49:
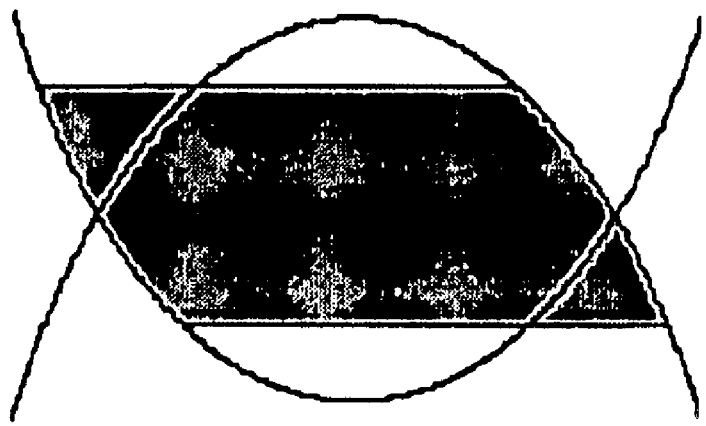
FIG. 49 shows another other possible termination for FIG. 47.

FIG. 46 illustrates cellular decomposition for a sweep from surface 4600 to surface 4602. The termination surfaces are represented as two curves. FIG. 47 is a tool body graph for FIG. 46. FIG. 48 shows one possible solution. FIG. 49 shows the other possible termination. The present invention returns all solutions, leaving it either to user selection or a heuristic to determine which solution in preferred. One possible heuristic is to return the solution in which the from-termination is closest to the profile being swept.

Motivated by the desire to recover the simplicity of the single body case, it is useful to introduce the idea of "bundle vertices." The purpose of bundle vertices is to gather (bundle) multiple edges that collectively form valid terminations. A tool graph with bundle vertices added is called a "bundle graph". One bundle graph (called the "F-graph") is created for the potential "from" terminations, and one (called the "T-graph") is created for the potential "to" terminations.

The steps for creating a F-graph are listed below. The steps for a T-graph are the same with the appropriate name changes (T for F, from-edge for to-edge):

1. Remove all from-edges from the tool graph. The resulting graph is called G\f (where G is the tool graph).
2. For each pair of components A and B in G\f (a "component" is a maximal connected sub-graph of a graph), add a bundle vertex to G\f if there is at least one from-edge in G on exactly one vertex of A and one vertex of B. To the new bundle vertex, add edges between the bundle vertex and vertices a in A and b in B if there is an edge in G on a and b.

Figure 50:
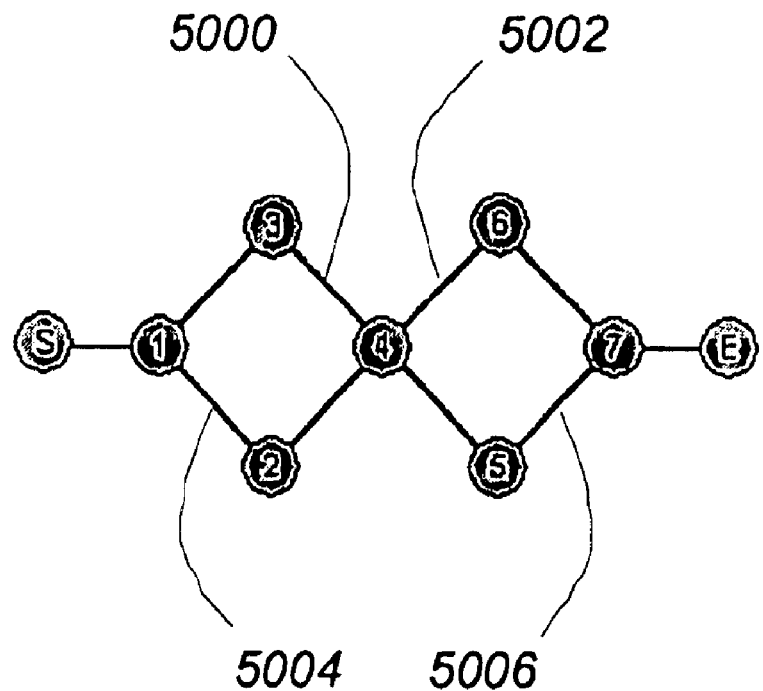
FIG. 50 illustrates a tool graph from FIG. 47.

FIG. 50 illustrates a tool graph from FIG. 47. This is graph G. The from-face edges are labeled as 5000, 5002, 5004, and 5006

Figure 51:
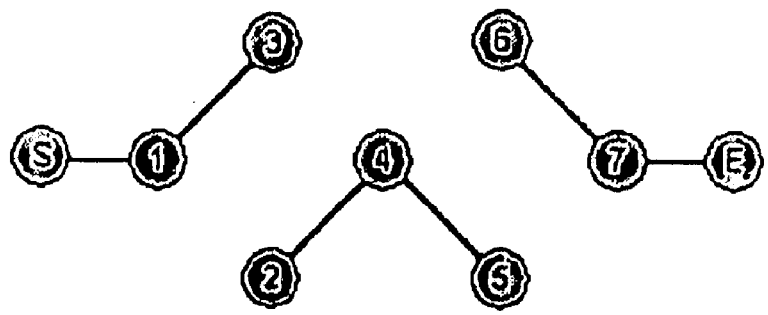
FIG. 51 illustrates Graph G\f containing three components.

FIG. 51 illustrates Graph G\f containing three components, excluding the from-face edges 5000, 5002, 5004, and 5006.

Figure 52:
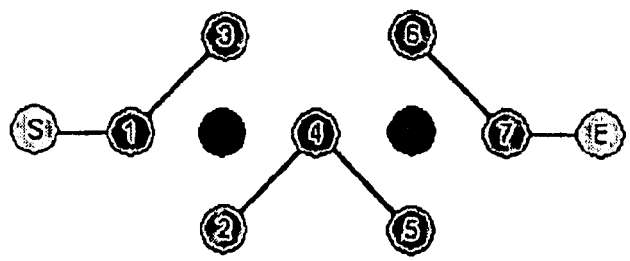
FIG. 52 illustrates how bundle vertex F1 is added for components 3 and 4 and how bundle vertex F2 is added for components 4 and 6.

FIG. 52 illustrates how bundle vertex F1 is added for components 3 and 4 (components are named after any of their vertices) because 3–4 is an edge of G. (1–2 would have done just as well to satisfy the criteria for creating F1). Similarly, F2 is added for components 4 and 6 since 4–6 is an edge of G.

Figure 53:
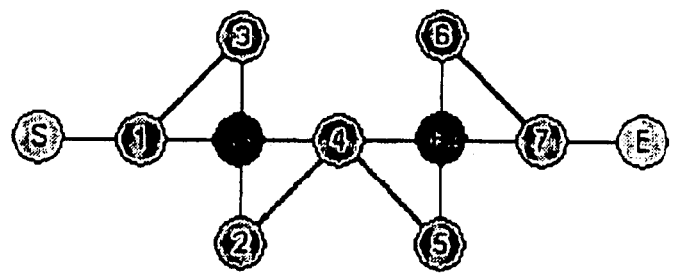
FIG. 53 illustrates how edges are added from vertices F1 and F2 to the components of G\f.

FIG. 53 illustrates how edges F1-3 and F1-4 are added because 3–4 is an edge of G connecting the components associated with F1. F1-1, F1-2, F2-4, F2-5, F2-6, and F2-7 are added for similar reasons. The resulting graph is the F-graph.

Figure 54:
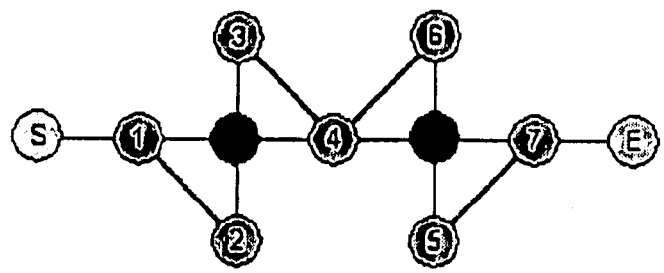
FIG. 54 illustrates how a T-graph is created.

FIG. 54 illustrates how a similar process yields the T-graph.

From the F-graph and the T-graph, one can generate all reasonable termination combinations. Each T bundle vertex is "allowable" if it is a cut vertex (a cut vertex is a vertex whose removal increases the number of components in a graph—similar to the definition of a bridge, except it applies to vertices rather than edges), and if the removal of the bundle vertex yields a graph in which the start and end termination vertices are in separate components.

The set of all possible terminations are generated by considering the set of all pairs of allowable bundle vertices, one in the F-graph, one in the T-graph. Only pairs that meet a compatibility criterion are acceptable solutions. If one removes the bundle vertices in question from the F-graph and the T-graph (called "puncturing the graph"), each punctured graph becomes disconnected with their termination vertices in separate components (as per the definition of allowable bundle vertices). If either the S component (the component containing the S-vertex) of the punctured F-graph (with the bundle vertex deleted) is disjoint from the E component of the punctured T-graph, or the E component of the punctured F-graph is disjoint from the S component of the punctured T-graph, then the bundle vertices are compatible. This compatibility criterion ensures that the from-termination does not interfere in some way with the to-termination.

Figure 55:
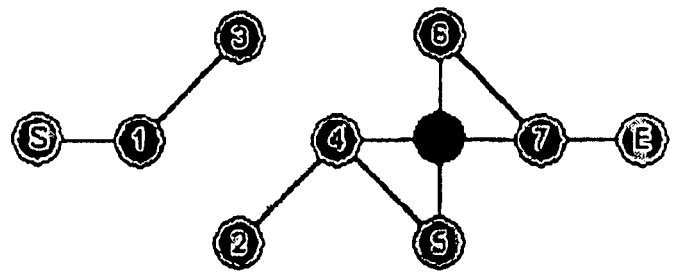
FIG. 55 illustrates a punctured F-graph with F1 removed.

FIG. 55 illustrates the punctured F-graph with F1 removed.

Figure 56:
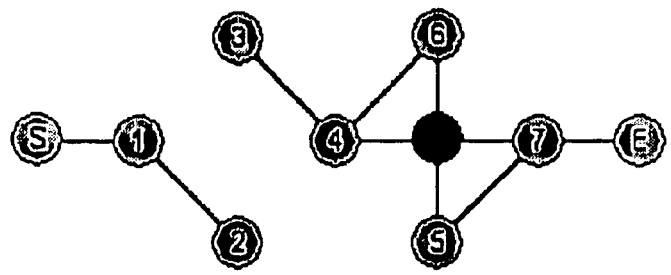
FIG. 56 illustrates a punctured T-graph with T1 removed.

FIG. 56 illustrates the punctured T-graph with T1 removed. The S component of the punctured F-graph contains vertex 3, as does the E component of the punctured T-graph. Also, the E component of the punctured F-graph contains vertex 2, as does the S component of the punctured T graph. Therefore, F1 and T1 are not compatible as terminations.

Figure 57:
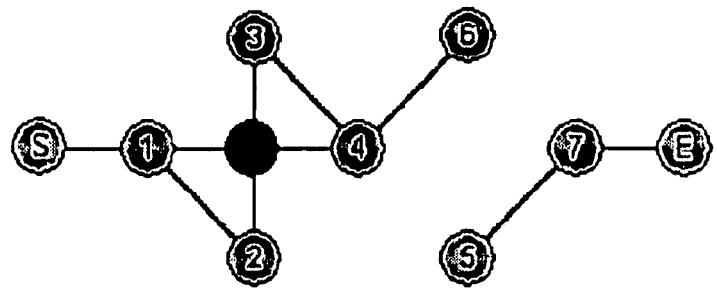
FIG. 57 illustrates a punctured T-graph with T2 removed.

FIG. 57 illustrates the punctured T-graph with T2 removed. The S component of the punctured F-graph is disjoint from the E component of the punctured T-graph; therefore F1 and T2 are compatible as terminations.

For some applications, it may turn out that the compatibility criterion is too harsh. It may be that even when the terminations interfere with each other, sense can be made of the result. For example, in FIG. 46, cell 2 may be the desired result (especially if cell 3 is small, maybe even negligible).

Once a compatible pair of terminations is chosen (either by a heuristic choice or by explicit user selection), the terminated tool body can be determined. In the process of determining compatibility, it was found that one component of the punctured F-graph containing a termination vertex was disjoint for a component of the punctured T-graph containing the opposition termination vertex. Removing the vertices in these disjoint components from the tool graph leaves the vertices whose corresponding cells make up the truncated tool body.

Figure 58:
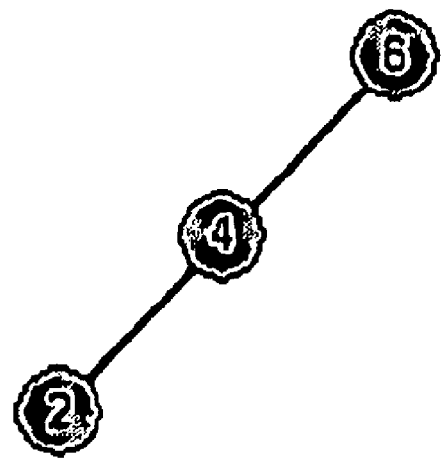
FIG. 58 illustrates how a termination pair (F1, T2), the S component of the F-graph, and the E component of the tool graph are removed from the tool graph, leaving only these cells which make up the terminated tool body.

As shown in FIG. 58, for the termination pair (F1, T2), the S component of the F-graph (S-1-3 from FIG. 55), and the E component of the tool graph (5-7-E from FIG. 57) are removed from the tool graph, leaving only these cells which make up the terminated tool body (2-4-6).

Figure 59:
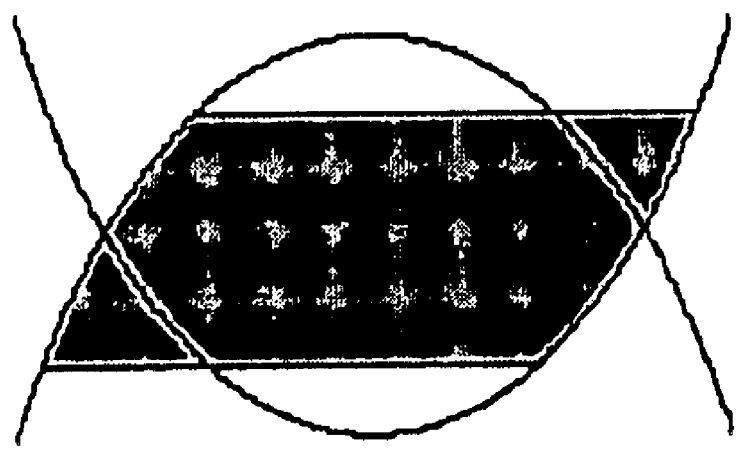
FIG. 59 illustrates the resulting tool body from FIG. 58.

FIG. 59 illustrates the resulting tool body for this case.

"To-Face" Terminations

To-face terminations are handled as a special case of from-to terminations. This case is easier since there is no possibility of the from-body and to-body interfering. One simply chooses an allowable bundle vertex in the T-graph, and discards the portion of the punctured T-graph containing end termination vertex. Furthermore, since there is no need to even consider the target-body if it is distinct from the to-body, this can be converted to a single-body problem and solved with single-body methods.

Handling of Multiple Component Tool Bodies

If multiple profiles (such as disjoint discs) are to sweep simultaneously, a tool body can be generated with multiple lumps. In this case, the tool graph has multiple components. These components can be handled separately. The complete terminated tool body is simply the union of the partial results. Other methods of handling tool-bodies with multiple components can be implemented without deviating from the scope of this invention.

Post Processing

Step 1—Integrate Results (Block 4214 in FIG. 42)

Three situations can occur:

1. There is no target body. In this case, the truncated tool body is the final result. It can be computed as the union of the cells of the truncated tool body.

2. There is a target body, but since a from-to or to-face termination is being done and the target body was neither the from-body nor the to-body, the target body did not participate in the analysis. In this case, the truncated tool body can be Booleaned with the target body to for the final result.

3. There is a target body, and it participated in the cellular decomposition. In this case, the truncated tool body graph can be Booleaned with the blank body graph (created in the preprocessing step). The union of the cells in this combined graph becomes the output body. Of course, option two can be done even in this case, but doing it all in one step is probably faster.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or system for terminating sweeps in a solid modeling system could benefit from the present invention. A computer program other than a solid modeling system, including perhaps a 2D drawing program (wherein the bodies are in fact flat similar to the example figures contained herein) could benefit from this invention. Those skilled in the art will recognize that tracking from-faces, to-faces, from-bodies and to-bodies can be implemented in ways other than that described herein without deviating from the scope of the present invention. Those skilled in the art will recognize that resolving multiple solutions using other heuristics than those mentioned herein are within the scope of the present invention. Those skilled in the art will recognize that handling multi-lump tool-bodies (typically generated from profiles with multiple loops) in ways other than those explicitly mentioned herein are within the scope of the present invention.

In summary, the present invention discloses a parametric, feature-based solid modeling system that provides a graph-based method for multi-bodied sweep terminations. Specifically, the present invention comprises a method, apparatus, and article of manufacture for terminating profile sweeps for multiple bodies in a computer-implemented solid modeling system. A planar profile of one or more curves is generated, and the profile is swept along a specified path to generate a tool body. The swept profile is terminated after the tool body interacts with a plurality of solid or sheet bodies to a predefined extent. The termination is comprised of three phases: (1) a pre-processing phase is performed to label faces and edges of the tool and blank bodies; (2) an analysis phase is performed to extract tool and blank graphs for the labeled faces and edges; and (3) a post-processing phase is performed to integrate results from the extracted tool and blank graphs.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for terminating profile sweeps for multiple bodies in a computer-implemented solid modeling system, comprising:
   (a) generating a planar profile of one or more curves;
   (b) sweeping the profile along a specified path to generate a tool body; and
   (c) terminating the swept profile, when the tool body interacts with a plurality of blank bodies to a predefined extent, using a graph-based method for multi-bodied sweep terminations.

2. The method of claim 1, wherein the terminating step (c) comprises:
   (1) performing a pre-processing phase to create a cellular topology graph of the tool and blank bodies;
   (2) performing an analysis phase to extract tool and blank graphs from the cellular topology graph; and
   (3) performing a post-processing phase to integrate results from the extracted tool and blank graphs.

3. The method of claim 2, wherein the pre-processing phase labels faces and edges of the tool and blank bodies.

4. The method of claim 3, wherein the pre-processing phase tracks which faces came from which body.

5. The method of claim 3, wherein the pre-processing phase propagates edge attributes for each face of a sheet.

6. The method of claim 3, wherein the faces and edges are labeled with attributes.

7. The method of claim 2, wherein the pre-processing phase constructs a blank body.

8. The method of claim 2, wherein the pre-processing phase performs cellular decomposition on the tool body and blank body to create the cellular topology graph.

9. The method of claim 2, wherein the analysis phase adds termination vertices to the tool graph.

10. The method of claim 2, wherein the analysis phase derives bundle graphs from the tool graph that are used to determine the potential "from" and "to" terminations.

11. The method of claim 2, wherein the analysis phase performs label propagation in which marking of faces as a from-face or to-face are propagated to faces adjacent to those faces originally marked as from-faces and to-faces.

12. The method of claim 2, wherein the analysis phase handles a specific termination type relative to the bodies.

13. The method of claim 2, wherein an output of the analysis phase is a graph whose vertices represent cells that are used to create an output body.

14. The method of claim 2, wherein the post-processing phase integrates results from the analysis phase according to the Boolean operation.

15. The method of claim 14, wherein the results comprise a truncated tool body computed as a union of cells of the tool body.

16. The method of claim 14, wherein the results comprise a truncated tool body computed from the Boolean operation of the tool body with a target body.

17. The method of claim 14, wherein the results comprise a truncated tool body computed from the Boolean operation of the tool body with the blank body created in the pre-processing step.

18. The method of claim 1, wherein the tool body interacts with the blank bodies according to one or more Boolean operations selected from a group comprising a joining operation of the tool body with one or more of the blank bodies, a cutting operation of the tool body from one or more of the blank bodies, and an intersecting operation of the tool body with one or more of the blank bodies.

19. The method of claim 1, wherein the predefined extent is selected from a group comprising:
   (1) Distance, wherein the tool body is generated by sweeping the profile, and the tool body extends to a predefined length;
   (2) All, wherein the tool body extends through the blank body, but no further;
   (3) To-next, wherein the tool body extends to a first face on the blank body, wherein the first face completely cuts the tool body;
   (4) To-face, wherein the tool body extends up to, but does not penetrate, a selected face; and
   (5) From-to, wherein the tool body is swept between two selected faces.

20. An apparatus for terminating profile sweeps for multiple bodies, comprising:
   (a) a computer; and
   (b) a solid modeling system, executed by the computer, having logic for:
      (1) generating a planar profile of one or more curves;
      (2) sweeping the profile along a specified path to generate a tool body; and
      (3) terminating the swept profile, when the tool body interacts with a plurality of blank bodies to a predefined extent, using a graph-based method for multi-bodied sweep terminations.

21. The apparatus of claim 20, wherein the logic for terminating (3) comprises:
   (i) logic for performing a pre-processing phase to create a cellular topology graph of the tool and blank bodies;
   (ii) logic for performing an analysis phase to extract tool and blank graphs from the cellular topology graph; and
   (iii) logic for performing a post-processing phase to integrate results from the extracted tool and blank graphs.

22. The apparatus of claim 21, wherein the pre-processing phase labels faces and edges of the tool and blank bodies.

23. The apparatus of claim 22, wherein the pre-processing phase tracks which faces came from which body.

24. The apparatus of claim 22, wherein the pre-processing phase propagates edge attributes for each face of a sheet.

25. The apparatus of claim 22, wherein the faces and edges are labeled with attributes.

26. The apparatus of claim 21, wherein the pre-processing phase constructs a blank body as a target body.

27. The apparatus of claim 21, wherein the pre-processing phase performs cellular decomposition on the tool body and blank body to create the cellular topology graph.

28. The apparatus of claim 21, wherein the analysis phase adds termination vertices to the tool graph.

29. The apparatus of claim 21, wherein the analysis phase derives bundle graphs from the tool graph that are used to determine the potential "from" and "to" terminations.

30. The apparatus of claim 21, wherein the analysis phase performs label propagation in which marking of faces as a from-face or to-face are propagated to faces adjacent to those faces originally marked as from-faces and to-faces.

31. The apparatus of claim 21, wherein the analysis phase handles a specific termination type relative to the bodies.

32. The apparatus of claim 21, wherein an output of the analysis phase is a graph whose vertices represent cells that are used to create an output body.

33. The apparatus of claim 21, wherein the post-processing phase integrates results from the analysis phase according to the Boolean operation.

34. The apparatus of claim 33, wherein the results comprise a truncated tool body computed as a union of cells of the tool body.

35. The apparatus of claim 33, wherein the results comprise a truncated tool body computed from the Boolean operation of the tool body with a target body.

36. The apparatus of claim 33, wherein the results comprise a truncated tool body computed from the Boolean operation of the tool body with the blank body created in the pre-processing step.

37. The apparatus of claim 20, wherein the tool body interacts with the blank bodies according to one or more Boolean operations selected from a group comprising a joining operation of the tool body with one or more of the blank bodies, a cutting operation of the tool body from one or more of the blank bodies, and an intersecting operation of the tool body with one or more of the blank bodies.

38. The apparatus of claim 20, wherein the predefined extent is selected from a group comprising:
   (1) Distance, wherein the tool body is generated by sweeping the profile, and the tool body extends to a predefined length;
   (2) All, wherein the tool body extends through the blank body, but no further;
   (3) To-next, wherein the tool body extends to a first face on the blank body, wherein the first face completely cuts the tool body;
   (4) To-face, wherein the tool body extends up to, but does not penetrate, a selected face; and
   (5) From-to, wherein the tool body is swept between two selected faces.

39. An article of manufacture embodying logic for terminating profile sweeps for multiple bodies in a computer-implemented solid modeling system, the logic comprising:
   (a) generating a planar profile of one or more curves;
   (b) sweeping the profile along a specified path to generate a tool body; and
   (c) terminating the swept profile, when the tool body interacts with a plurality of blank bodies to a predefined extent, using a graph-based method for multi-bodied sweep terminations.

40. The article of manufacture of claim 39, wherein the terminating step (c) comprises:
   (1) performing a pre-processing phase to create a cellular topology graph of the tool and blank bodies;
   (2) performing an analysis phase to extract tool and blank graphs from the cellular topology graph; and
   (3) performing a post-processing phase to integrate results from the extracted tool and blank graphs.

41. The article of manufacture of claim 40, wherein the pre-processing phase labels faces and edges of the tool and blank bodies.

42. The article of manufacture of claim 41, wherein the pre-processing phase tracks which faces came from which body.

43. The article of manufacture of claim 41, wherein the pre-processing phase propagates edge attributes for each face of a sheet.

44. The article of manufacture of claim 41, wherein the faces and edges are labeled with attributes.

45. The article of manufacture of claim 40, wherein the pre-processing phase constructs a blank body as a target body.

46. The article of manufacture of claim 40, wherein the pre-processing phase performs cellular decomposition on the tool body and blank body to create the cellular topology graph.

47. The article of manufacture of claim 40, wherein the analysis phase adds termination vertices to the tool graph.

48. The article of manufacture of claim 40, wherein the analysis phase derives bundle graphs from the tool graph that are used to determine the potential "from" and "to" terminations.

49. The article of manufacture of claim 40, wherein the analysis phase performs label propagation in which marking of faces as a from-face or to-face are propagated to faces adjacent to those faces originally marked as from-faces and to-faces.

50. The article of manufacture of claim 40, wherein the analysis phase handles a specific termination type relative to the bodies.

51. The article of manufacture of claim 40, wherein an output of the analysis phase is a graph whose vertices represent cells that are used to create an output body.

52. The article of manufacture of claim 40, wherein the post-processing phase integrates results from the analysis phase according to the Boolean operation.

53. The article of manufacture of claim 52, wherein the results comprise a truncated tool body computed as a union of cells of the tool body.

54. The article of manufacture of claim 52, wherein the results comprise a truncated tool body computed from the Boolean operation of the tool body with a target body.

55. The article of manufacture of claim 52, wherein the results comprise a truncated tool body computed from the Boolean operation of the tool body with the blank body created in the pre-processing step.

56. The article of manufacture of claim 39, wherein the tool body interacts with the blank bodies according to one or more Boolean operations selected from a group comprising a joining operation of the tool body with one or more of the blank bodies, a cutting operation of the tool body from one or more of the blank bodies, and an intersecting operation of the tool body with one or more of the blank bodies.

57. The article of manufacture of claim 39, wherein the predefined extent is selected from a group comprising:
(1) Distance, wherein the tool body is generated by sweeping the profile, and the tool body extends to a predefined length;
(2) All, wherein the tool body extends through the blank body, but no further;
(3) To-next, wherein the tool body extends to a first face on the blank body, wherein the first face completely cuts the tool body;
(4) To-face, wherein the tool body extends up to, but does not penetrate, a selected face; and
(5) From-to, wherein the tool body is swept between two selected faces.

* * * * *